US010783476B2

(12) United States Patent
Allen et al.

(10) Patent No.: US 10,783,476 B2
(45) Date of Patent: Sep. 22, 2020

(54) SYSTEM FOR CUSTOMIZED INTERACTIONS-RELATED ASSISTANCE

(71) Applicant: Walmart Apollo, LLC, Bentonville, AR (US)

(72) Inventors: William Ross Allen, Pea Ridge, AR (US); Jimmie Clark, Fayetteville, AR (US); Richard Montgomery Blair, II, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 119 days.

(21) Appl. No.: 16/215,368

(22) Filed: Dec. 10, 2018

(65) Prior Publication Data
US 2019/0237083 A1  Aug. 1, 2019

Related U.S. Application Data

(60) Provisional application No. 62/622,821, filed on Jan. 26, 2018.

(51) Int. Cl.
*G06Q 10/06* (2012.01)
*G10L 15/30* (2013.01)
(Continued)

(52) U.S. Cl.
CPC ... *G06Q 10/06398* (2013.01); *G06Q 10/0639* (2013.01); *G09B 5/00* (2013.01);
(Continued)

(58) Field of Classification Search
CPC ......... G10L 15/30; G10L 15/22; G10L 15/26; G10L 15/20; G10L 13/00; G10L 13/02;
(Continued)

(56) References Cited

U.S. PATENT DOCUMENTS 8,715,178 B2  5/2014  Price et al.
9,202,110 B2  12/2015  Movellan et al.
(Continued)

OTHER PUBLICATIONS

Copenheaver, Blaine R., "International Search Report", International Application No. PCT/US2018/064787, dated Feb. 25, 2019, 2 pages.
(Continued)

*Primary Examiner* — Andrew C Flanders

(57) ABSTRACT

Examples provide a system for customizing remote interactions-related real-time assistance for trainees during training exercises. The system analyzes a first set of actions taken by a trainee during a first interaction using a set of recommended action criteria to generate an interaction score indicating a degree of conformity with recommended action criteria. The system analyzes a second set of actions taken by the trainee during a different second interaction. If the second set of actions are conforming or the interaction score is within an acceptable threshold range, the system continues to monitor the second interaction without providing assistance. If the second set of actions are non-conforming and the interaction score is within an unacceptable threshold range, the system provides real-time interaction assistance to the trainee, such as by outputting interaction recommendation instructions and/or assigning a more experience user to assist the trainee.

20 Claims, 12 Drawing Sheets

(51) Int. Cl.
*G09B 5/00* (2006.01)
*G10L 25/51* (2013.01)
*G09B 19/00* (2006.01)
*G10L 15/26* (2006.01)
*G09B 5/12* (2006.01)
*G09B 7/00* (2006.01)

(52) U.S. Cl.
CPC ............. *G09B 5/125* (2013.01); *G09B 7/00* (2013.01); *G09B 19/00* (2013.01); *G10L 15/26* (2013.01); *G10L 15/30* (2013.01); *G10L 25/51* (2013.01)

(58) Field of Classification Search
CPC ..... G10L 17/22; G10L 25/72; G06Q 10/0639; G06Q 10/06393; G06Q 10/06395; G06Q 10/06398; G06Q 10/063114; G06Q 10/0637; G06Q 30/0615; G06Q 30/0281; G06Q 30/01; G06Q 30/016; G06Q 30/0282; G09B 5/00; G09B 5/125; G09B 19/00; G09B 7/00
See application file for complete search history.

(56) References Cited

U.S. PATENT DOCUMENTS

| | | | |
|---|---|---|---|
| 2002/0059164 A1 | 5/2002 | Shtivelman | |
| 2006/0073449 A1 | 4/2006 | Kumar et al. | |
| 2007/0198325 A1* | 8/2007 | Lyerly | G06Q 10/06311 705/7.13 |
| 2010/0223074 A1* | 9/2010 | Parker | G06Q 50/24 705/3 |
| 2013/0129071 A1 | 5/2013 | Teitelman et al. | |
| 2014/0063236 A1 | 3/2014 | Shreve et al. | |
| 2015/0201077 A1 | 7/2015 | Konig et al. | |
| 2016/0042419 A1 | 2/2016 | Singh | |
| 2016/0225283 A1 | 8/2016 | Fry et al. | |
| 2016/0364661 A1* | 12/2016 | Hurst | G06Q 10/0635 |
| 2016/0371673 A1 | 12/2016 | Eramian et al. | |
| 2017/0068976 A1* | 3/2017 | Wawrzynowicz | G06Q 30/0203 |
| 2017/0092264 A1* | 3/2017 | Hakkani-Tur | G06F 40/30 |
| 2017/0123824 A1 | 5/2017 | Franck | |
| 2017/0154293 A1* | 6/2017 | Baduge | G10L 25/87 |
| 2017/0213190 A1* | 7/2017 | Hazan | G06Q 10/1053 |
| 2017/0221072 A1* | 8/2017 | AthuluruTlrumala | G06F 3/0482 |
| 2017/0300990 A1* | 10/2017 | Tanaka | G10L 17/005 |
| 2018/0040046 A1* | 2/2018 | Gotoh | G10L 15/26 |
| 2018/0096278 A1* | 4/2018 | Lev-Tov | G06F 16/9535 |
| 2018/0168498 A1* | 6/2018 | Bernstein | A61B 5/165 |
| 2019/0095843 A1* | 3/2019 | Muthuswamy | G06F 40/30 |
| 2019/0340622 A1* | 11/2019 | Azoulay | G06Q 30/016 |

OTHER PUBLICATIONS

Copenheaver, Blaine R., "Written Opinion of the International Searching Authority", International Application No. PCT/US2018/064787, dated Feb. 25, 2019, 2 pages.

Katz, Lee Michael, "Monitoring Employee Productivity: Proceed with Caution", SHRM, Jun. 1, 2015, https://www.shrm.org/hr-today/news/hr-magazine/pages/0615-employee, 6 pages.

Melendez, et al., "The Office is Watching You," Fast Company, May 22, 2015, 7 pages.

Unknown, "Workforce Optimization Suite Interaction Recorder," Interactive Intelligence, 2015, 2 pages.

Friedman, "How Your Business Can Begin Using Wearable Tech Today," Brainxchange, Accessed Aug. 24, 2017, 5 pages.

* cited by examiner

*FIG. 11*

SET OF RECOMMENDED ACTION CRITERIA 132

RECOMMENDED ACTIONS 714

REMAIN CALM
UNCROSSED ARMS
RELAXED POSTURE
RELAXED / OPEN HANDS (NO FIST)
EYE CONTACT
REPEAT OTHER PERSON'S WORDS BACK (MIRRORING)
SAY "MAY I HELP YOU?"
SAY "ANYTHING ELSE I CAN DO FOR YOU?"
AVOID INTERRUPTIONS

SYSTEM FOR CUSTOMIZED INTERACTIONS-RELATED ASSISTANCE

BACKGROUND

People working in fields requiring contact and interactions with a number of other people face many diverse challenges, such as, but not limited to, answering questions, providing directions, locating items, and attempting to problem solve any other issues which can arise. Some issues require specialized knowledge and/or involve interacting with a variety of individuals in diverse situations. Although every situation is different, there are frequently recommended methods, policies, and/or procedures for successfully interacting with others in similar situations or preferred methods of addressing various types of problems. However, it is frequently necessary to train more than one person at a time. This reduces available time for providing personalized feedback, individualized instruction and/or guidance to each trainee when teachable moments occur in real-time due to the number of trainees, size of a training area and/or the rate of turnover. Thus, manual training can be a time consuming, inefficient and labor-intensive process.

SUMMARY

Some examples of the disclosure provide a system for customized remote interactions-related assistance. The system includes a memory; at least one processor communicatively coupled to the memory; and a set of sensor devices generating sensor data associated with a monitored area. The set of sensor devices includes at least one microphone. An interaction monitor component identifies an event associated with a first user based on analysis of the sensor data. The identified event includes an interaction between the first user and one or more other users occurring within the monitored area. The interaction monitor component monitors the interaction in real-time and identifies a set of actions taken by the first user during the interaction. A response analysis component analyzes the identified set of actions using a set of recommended action criteria to determine if the identified set of actions results in resolution of the identified event and substantially conformity of the set of action with a set of recommended action criteria. The set of recommended action criteria includes one or more recommended actions for resolving a same or similar situation associated with the identified event. If the identified event remains unresolved and the set of actions taken by the user are substantially non-conforming with the set of recommended action criteria, the response analysis component retrieves one or more previous interaction scores associated with the first user from a data storage device. If the one or more interaction scores is within an unacceptable score threshold range, a notification component outputs a resolution assistance notification to at least one user device associated with at least one user. The resolution assistance notification includes an instruction to assist the first user in resolving the identified event.

Other examples provide a computer-implemented method for customized remote interactions-related assistance. A response analysis component analyzes a set of actions taken by a first user during an interaction between the first user and a second user to resolve a situation associated with the second user using a set of recommended action criteria. The response analysis component determines if the set of actions taken by the first user during a course of an interaction between the first user and the second user substantially conforms to a set of recommended action criteria. The set of recommended action criteria includes at least one recommended action for resolving a same or similar situation as the identified event. If the set of actions taken are substantially non-conforming with the set of recommended action criteria, the response analysis component retrieves a set of previous interaction scores associated with the first user from a data storage device. If the set of previous interaction scores is a null set, a task allocation component outputs a task assignment to a user device associated with a third user via a network. The task assignment instructs the third user to assist the first user in resolving the situation. If the set of previous interaction scores is within an unacceptable score threshold range, the task allocation component outputs the task assignment to the user device associated with the third user via the network. The task assignment instructs the third user to assist the first user. If the set of previous interaction scores is within an acceptable score threshold range, an interaction monitoring component continues to monitor the interaction without providing additional assistance unless an assistance request is received from a user device associated with the first user.

Still other examples provide a system for customizing remote interactions-related assistance. The system includes a memory; at least one processor communicatively coupled to the memory; and a set of sensor devices generating sensor data within a set of geographical boundaries defining a monitored area. An interaction monitor component identifies a first set of actions taken by the first user during a first interaction with a second user based on the sensor data. A response analysis component analyzes the first set of actions using a set of recommended action criteria. The response analysis component determines whether the first set of actions conform to a set of recommended action criteria. The set of recommended action criteria includes one or more recommended actions for resolving a same or similar situation associated with the first interaction. A score generation component generates a first interaction score associated with the first interaction based on the analyzed first set of actions and an outcome of the first interaction. The first interaction score indicates a degree with which the first set of actions conforms with the set of recommended action criteria. The interaction monitor component identifies a second set of actions taken by the first user during a second interaction with a third user based on analysis of the sensor data. A notification component outputs additional instruction to the first user recommending at least one action to be taken by the first user during the second interaction to facilitate resolution of the second interaction.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 11 is an exemplary block diagram illustrating a set of recommended action criteria.

Corresponding reference characters indicate corresponding parts throughout the drawings.

DETAILED DESCRIPTION

Referring to the figures, examples of the disclosure enable a system for providing real-time interactions-related assistance by a remote computing device. In some examples, the system analyzes user interactions within a monitored area using a set of recommended action criteria to determine whether to aid, such as recommendations, for achieving a desirable outcome of the interaction. This enables improved user efficiency and increased user interaction performance.

Figure 1:
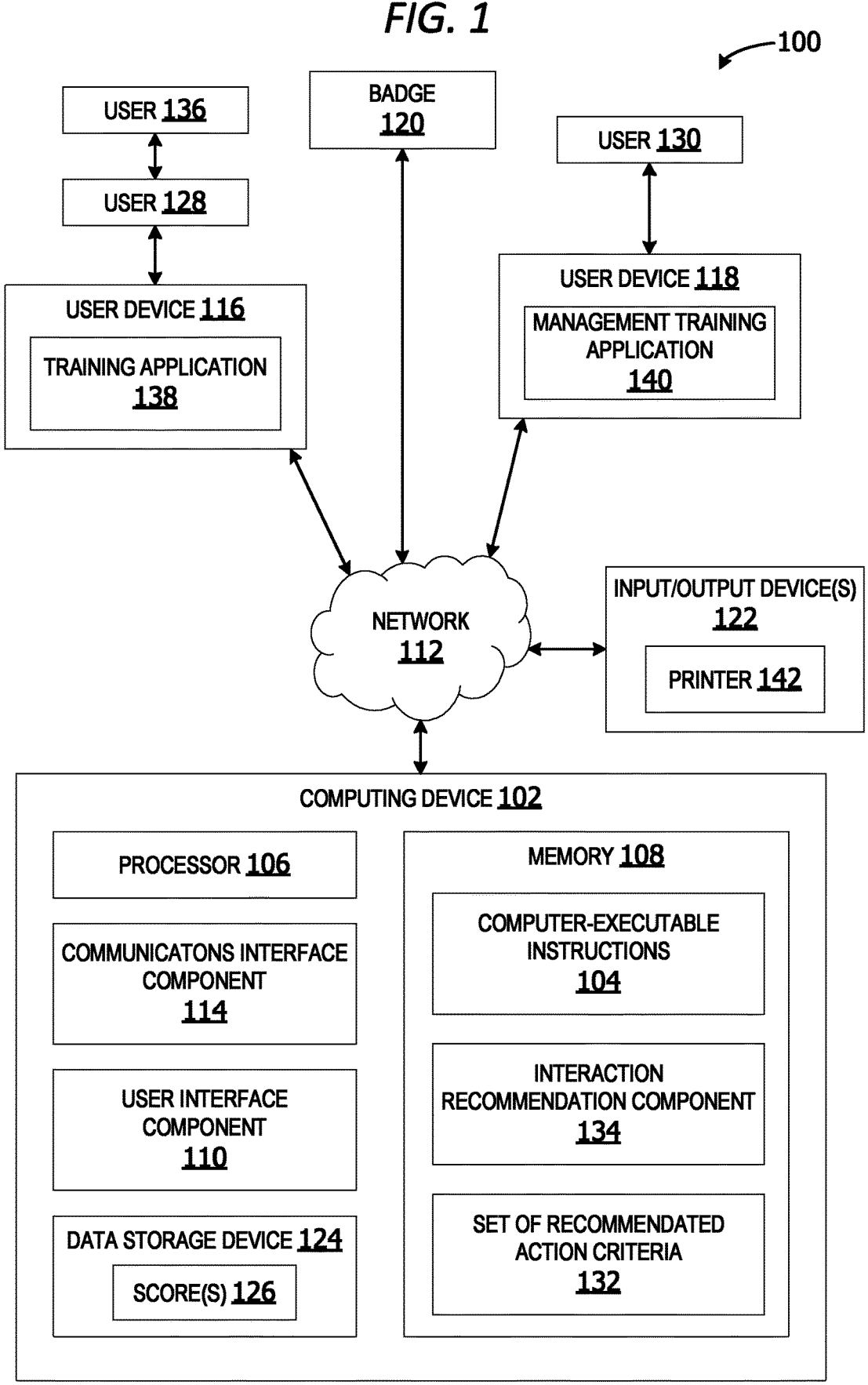
FIG. 1 is an exemplary block diagram illustrating a system for providing remote interactions-related assistance.

Referring again to FIG. 1, an exemplary block diagram illustrates a system 100 for providing remote interactions-related assistance. In the example of FIG. 1, the computing device 102 represents any device executing computer-executable instructions 104 (e.g., as application programs, operating system functionality, or both) to implement the operations and functionality associated with the computing device 102. The computing device 102 can include a mobile computing device or any other portable device. In some examples, the mobile computing device includes a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106, a memory 108, and at least one user interface component 110. The processor 106 includes any quantity of processing units and is programmed to execute the computer-executable instructions 104. The computer-executable instructions 104 can be performed by the processor 106 or by multiple processors within the computing device 102 or performed by a processor external to the computing device 102. In some examples, the processor 106 is programmed to execute instructions such as those illustrated in the figures (e.g., FIG. 12, FIG. 13, and FIG. 14).

The computing device 102 further has one or more computer readable media, such as the memory 108. The memory 108 includes any quantity of media associated with or accessible by the computing device 102. The memory 108 can be internal to the computing device 102 (as shown in FIG. 1), external to the computing device (not shown), or both (not shown). In some examples, the memory 108 includes read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. For example, the applications can represent downloaded client-side applications that correspond to server-side services executing in a cloud.

In other examples, the user interface component 110 includes a graphics card for displaying data to the user and receiving data from the user. The user interface component 110 can also include computer-executable instructions (e.g., a driver) for operating the graphics card. Further, the user interface component 110 can include a display (e.g., a touch screen display or natural user interface) and/or computer-executable instructions (e.g., a driver) for operating the display. The user interface component 110 can also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user can input commands or manipulate data by moving the computing device 102 in a particular way.

The network 112 is implemented by one or more physical network components, such as, but without limitation, routers, switches, network interface cards (NICs), and other network devices. The network 112 can be any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 114. The communications interface component 114 includes a network interface card and/or computer-executable instructions (e.g., a driver) for operating the network interface card. Communication between the computing device 102 and other devices, such as but not limited to the user device 116, the user device 118, a badge 120, and/or the input/output device(s) 122, can occur using any protocol or mechanism over any wired or wireless connection. In some examples, the communications interface component 114 is operable with short range communication technologies such as by using near-field communication (NFC) tags.

The system 100 can also optionally include a data storage device 124 for storing data, such as, but not limited to, one or more interaction score(s) 126 associated with one or more users, such as a user 128 and/or a user 130. An interaction score is a score for rating an interaction relative to one or more other interactions. The interaction score in other examples is a score indicating a degree with which a set of one or more actions taken by a user during an interaction with one or more other users conforms to a set of recommended action criteria 132, including one or more recommended actions and/or one or more rules for evaluating a current situation/circumstances associated with the interaction.

An interaction score can rank or rate a single interaction associated with a given user, such as the user 128. For example, if interaction scores are provided on a scale of 1 to 100, with 100 indicating a best score, the user can receive an interaction score of 54 for a first interaction assisting a user in locating a first item, an interaction score of 61 for a second interaction directing a user to a lawn and garden department, and an interaction score of 88 for a third interaction assisting a user with locating another item.

An interaction score can be a score for a category of interactions, representing a ranking for all interactions in the category. In these examples, the user receives a category-related interaction score for each category. In the example above, the interaction score of sixty-one for the second interaction can also be the category-related interaction score for interactions associated with providing directions if this is the only direction providing interaction for the user. In the same example, the interaction scores of 54 for the first interaction and the score of 88 for the second interaction can be averaged to find a category-related interaction score for interactions associated with locating items.

An interaction score in other examples provides an aggregate ranking for all interactions. The aggregate ranking is generated based on two or more different interactions in which the user was a participant. In the example above in which the user is assigned three different interaction scores for three different interactions, the user can be assigned an aggregate interaction score of 65 representing all three of the interactions.

The interaction score in still other examples includes an average score generated by averaging two or more different interaction scores together. In the example above in which the user is assigned three different interaction scores, the three scores of 54, 61, and 88 are added together and divided by three to obtain an average interaction score of 67.7.

The data storage device 124 can include a set of one or more data storage devices storing data. The data storage device 124 can include one or more different types of data storage devices, such as, for example, one or more rotating disks drives, one or more solid state drives (SSDs), and/or any other type of data storage device. The data storage device 124 in some non-limiting examples includes a redundant array of independent disks (RAID) array. In other examples, the data storage device 124 includes a database, such as, but not limited to, the database 1000 shown in FIG. 10 below.

The memory 108 further stores one or more computer-executable components, such as, but not limited to, an interaction recommendation component 134. The interaction recommendation component 134, when executed by the processor 106 of the computing device 102, in some examples, causes the processor 106 to analyze a set of actions taken by the user 128 during a course of an interaction between the user 128 and a second user 136 to achieve a goal, solve a problem, adhere to established standards, or achieve a desired outcome associated with the interaction. The interaction recommendation component 134 analyzes the set of actions using the set of recommended action criteria 132 to evaluate a situation, identify interaction context, identify actions taken by the user(s), and determine a degree of conformity or non-conformity of the actions taken by the user 128 with recommended actions.

The set of recommended action criteria 132 includes rules for evaluating a situation and/or recognizing circumstances associated with an interaction. For example, the rules can include a rule stating that detection of smoke indicates a potential fire. Another rule can indicate that detection of a person laying on the ground indicates a potential medical issue/injury. Still another rule can indicate detection of shivering indicates person is cold.

The interaction recommendation component 134 analyzes sensor data and other data input using the set of recommended action criteria 132 to evaluate the user. For example, the interaction recommendation component 134 can utilize criteria such as body language, tone of voice, choice of words, etc. to determine a status of the user. The status can indicate the user is injured, angry, nervous, agitated, frightened, sad, confused, searching for something, etc. This enables more efficient recognition of potential issues for more accurate conflict identification and resolution.

The interaction recommendation component 134 analyzes sensor data and other data input using the set of recommended action criteria 132 to evaluate the environment in the immediate area surrounding the user. For example, the interaction recommendation component 134 can utilize criteria such as temperature (heat), air quality (smoke), moisture (rain, wet floors), etc. The interaction recommendation component 134 determines a status/state of the environment. The status can include an empty shelf, a crowded walkway, a broken container, a leaking bottle, broken glass, a wet floor, a fire, etc.

The interaction recommendation component 134 utilizes artificial intelligence to determine one or more recommended actions for resolving the situation. The interaction recommendation component 134 then compares the user's actions with the recommended actions to determine whether the user's response is acceptable (conforming with recommended actions) or unacceptable (non-conforming with recommended actions) based on the set of recommended action criteria 132.

The set of recommended action criteria 132 in some examples includes one or more recommended actions to be employed by the user 128 during interactions with other individuals. The recommended actions can include mandatory actions, optional actions, suggested actions, or any other action. For example, a recommended action can include standing with arms uncrossed, waiting for the other person to finish speaking before beginning to speak to avoid interrupting other speakers, moderating tone of voice to prevent escalation of emotion during the interaction, etc. The recommended actions can also include actions such as scanning a barcode for a requested price check, performing a lookup on the user device 116 to obtain an item location, making an announcement via an intercom system, leading the other user 136 to the location of a desired item, providing directions to a desired item or location, requesting assistance from an individual in another department, or otherwise responding to a request. In some examples, the set of recommended action criteria 132 include actions recommended, required, or otherwise specified by one or more laws, ordinances, regulations, rules, policies, procedures, and/or safety guidelines to be performed in the same situation or a similar situation as the one in which the interaction is occurring between the user 128 and the user 136.

The situation is the set of circumstances associated with the interaction. The situation can include an attempt to locate an item, greeting a person, providing directions to a place or location where an item is stored/displayed, ordering an item, handling a simulated/practice complaint, assisting during an injury simulation during training, fire drill training, training associated with cleaning various types of spills or other situations, routine cleaning/maintenance training, simulated query responses in which a user attempts to answer practice questions appropriately, handling damaged items and/or broken containers, etc.

The set of recommended action criteria 132 can also include data points for sensor data analysis. The data points are used to identify stress levels, escalation or de-escalation of a situation, and/or identify situations in which a user requires additional assistance more rapidly than a human user would recognize the need for assistance. The data points in some examples include tone of voice, volume of voice, body language (gesture recognition, posture recognition, facial posture, proximity between individuals during training scenarios, biometrics of users (heart rate, perspiration, body temp), gaze, line of sight, focus, word choice, speed/rapidity with which words are spoken, orientation of body, orientation of limbs, posture, etc.

In some examples, if the interaction recommendation component 134 determines the action(s) taken by the user 128 substantially conforms with one or more recommended actions in the set of recommended action criteria 132 for the same situation or a similar situation, the interaction recommendation component 134 continues monitoring the interaction but takes no further action unless assistance is requested by the user 128. If the user 128 performs an unrecommended action/action prohibited by the set of recommended action criteria 132 and/or a threshold time-period is reached without resolving an issue associated with the interaction, the interaction recommendation component 134 retrieves a set of one or more interaction scores for the user. An issue associated with the interaction includes a problem to be solved, a question to be answered, or another result to be achieved before termination of the interaction.

The interaction recommendation component 134, in some examples, retrieves one or more interaction scores 126 generated for the user 128. The score(s) 126 are associated with one or more interactions in which the user 128 was involved. The score(s) 126 in this example are retrieved from the data storage device 124.

The score(s) 126 can include a different score for different types or categories of interactions. For example, there can be an interaction score for item location-related interactions in which the user 136 is requesting assistance from the user 128 in finding/locating a desired item, department or area within the training location. In another example, the score(s) 126 includes a different interaction score associated with training scenarios/exercises involving returning or exchanging items.

In yet another example, the score(s) 126 can include a different interaction score associated with assisting the user 136 with retrieving a desired item from an upper shelf, a back of a shelf out of reach, a backroom/storage area, or other area that is inaccessible to the user 136 or difficult to access by the user 136.

If there are no score(s) 126 for the user (null set), this can indicate the user has little or no experience with this type/category of interaction and/or the issue associated with the interaction. For example, if the user 136 is asking the other user 128 for assistance with locating an item and there are no available scores associated with item location issues, this can indicate that the user 128 is not yet familiar with the layout of the monitored area. In this example, the user 136 can be unable to provide accurate directions/guidance with regard to locating the desired item. Therefore, if there are no scores associated with the current interaction situation, the interaction recommendation component 134 automatically provides assistance/recommendations/instructions to the user 128 on the assumption that the user 128 is lacking experience/training in this area and/or is failing to respond as expected during a training exercise.

In some examples, the interaction recommendation component 134 can output the location of the desired item and/or directions to an area in which the desired item is displayed/stored to the user device 116 associated with the user 128 via the network 112. The additional instruction is provided automatically to the user device 116 without waiting for a request for assistance from the user 128. In other examples, the interaction recommendation component 134 sends a request to a user device 118 associated with another user 130 having greater experience with this issue/situation to assist the user 128 and/or provide additional guidance/training to the user 128.

If the score(s) 126 include a score assigned to the user 128 for the same or similar situation as the current interaction that is within an unacceptable score threshold range, the interaction recommendation component 134 automatically outputs the additional instructions to the user device 116 associated with the user 128 and/or assigns another user, such as the user 130, to assist the user 128 with resolving the issue. An unacceptable score threshold range is a range of scores indicating failure to adhere to recommended action criteria during one or more previous interactions involving the user 128 which occurred at some point in the past.

The user device 116 is a computing device associated with the user 128 involved in the interaction with the user 136. The user device 116 can include a mobile computing device or any other portable device. In some examples, the mobile computing device includes a mobile telephone, laptop, tablet, computing pad, netbook, gaming device, and/or portable media player. In this example, the user device 116 is executing a training application 138 for receiving additional instructions from the interaction recommendation component 134 and/or sending requests for additional assistance to the interaction recommendations component 134.

The user device 118 in this example is a computing device associated with the user 130. The user device 118 can include a mobile computing device or any other portable device. In some examples, the mobile computing device includes a mobile telephone, laptop, tablet, computing pad, netbook, gaming device, and/or portable media player. In this example, the user device 118 is executing a management training application 140 for receiving requests to assist another user, such as the user 128, from the interaction recommendation component 134, receiving status updates associated with the interaction, and/or sending requests for interaction status updates to the interaction recommendations component 134.

The badge 120 in this example is a smart badge device worn by the user 128. The badge 120 includes one or more sensor devices for generating sensor data within the monitored area. In some examples, the badge 120 only generates sensor data within a geofence area. The geofence area includes a set of geographical boundaries defining the monitored area in which the training is being performed. When the user enters the monitored area the badge device sensors begin generating and/or storing sensor data associated with interactions occurring in the area. When the user exits the monitored area, the badge device ceases generation of sensor data.

In some examples, the badge 120 utilizes global positioning system (GPS) sensors for detecting boundaries associated with a geofence. In other examples, the badge 120 utilizes Wi-Fi signal(s) associated with the network 112 for detecting boundaries associated with the geofence. In still other examples, the badge 120 utilizes beacon sensors for detecting boundaries associated with the geofence.

When the badge enters the monitored area, the badge 120 switches on and begins generating, analyzing, and/or storing sensor data. When the user wearing the badge 120 leaves the monitored area, the badge device switches off and ceases generating sensor data. When the badge device switches off, the sensor devices incorporated within the badge device turns off and stops generating sensor data.

In other examples, the badge 120 only generates sensor data within a temporal fence. The temporal fence defines a monitoring start-time and a monitoring end-time. The badge 120 only generates sensor data associated with training interactions occurring after the monitoring start-time. The badge device stops generating sensor data at the monitoring end-time.

The system 100 can optionally include one or more input/output device(s) 122, such as a printer 142. In this non-limiting example, the interaction recommendation component 134 and/or the training application 138 can send data to the input/output device(s) 122 for output to one or more users. For example, the training application 138 can send an anonymized transcript of dialogue between the first user 128 and the second user 136 to the printer 142 for print out. An anonymized transcript is a transcript of dialogue that excludes personally identifying data associated with one or more individuals involved in a given interaction, such as the user 128 and/or the user 136.

In other examples, the input/output device(s) 122 includes a display screen, a projector, a virtual reality headset, an augmented reality output device, a text-to-speech output device, a speaker, or any other type of output device. The input/output device(s) 122 can be utilized by the computing device 102, the user device 116, the badge 120, the user device 118, and/or any other devices connected to the input/output device(s) via the network 112 for outputting a status of an interaction, anonymized transcripts of dialogue, requests for additional assistance, additional interaction resolution instructions, or any other data associated with interactions occurring within the monitored area.

In this non-limiting example, the user 128, the user 136, and the user 130 are all located within a same location and/or the same structure/building. In other examples, the user 128 and the user 136 engage in an interaction in a first location or first building, while the user 130 associated with the user device 118 is located in a different building or other remote location. The interaction recommendation component 134 in this example autonomously monitors the interactions between the user 128 and the user 136, provides recommendations to the user 128, generates interaction status updates, interaction scores, and/or sends the status updates to the user 130 at the remote location via the network 112.

In other examples, the badge 120 includes one or more input/output devices, such as a microphone and/or a speaker. In some examples, instructions in an audio format are sent from the interaction recommended component to the user via the microphone incorporated within the badge device.

In other examples, the user device 116 includes one or more input/output devices, such as a display screen, microphone, speaker, touch screen, and/or any other type of input device and/or output device for receiving data from a user and outputting data to a user. The instructions in an audio format, a video format, a haptic format, and/or a combination of audio, video, and haptic format can be sent to the user from the interaction recommendation component via the user device 116 user interface and/or output device(s).

In other example, the additional instructions for resolving an interaction are sent from the interaction recommendation component to an audio device, such as an ear piece microphone or headset, in an audible format (audio format) for output to the user in a hands-free manner.

In some examples, the management training application 140 permits managers, training personnel, and other supervisors to view interaction status, interaction outcome, interaction scores, interaction transcripts, and other interaction related data. This interaction data can be provided live as the interactions are occurring in real-time. In other examples, the management training application 140 provides a dashboard of active communications/interactions and a log of all interactions and assistance provided.

Figure 2:
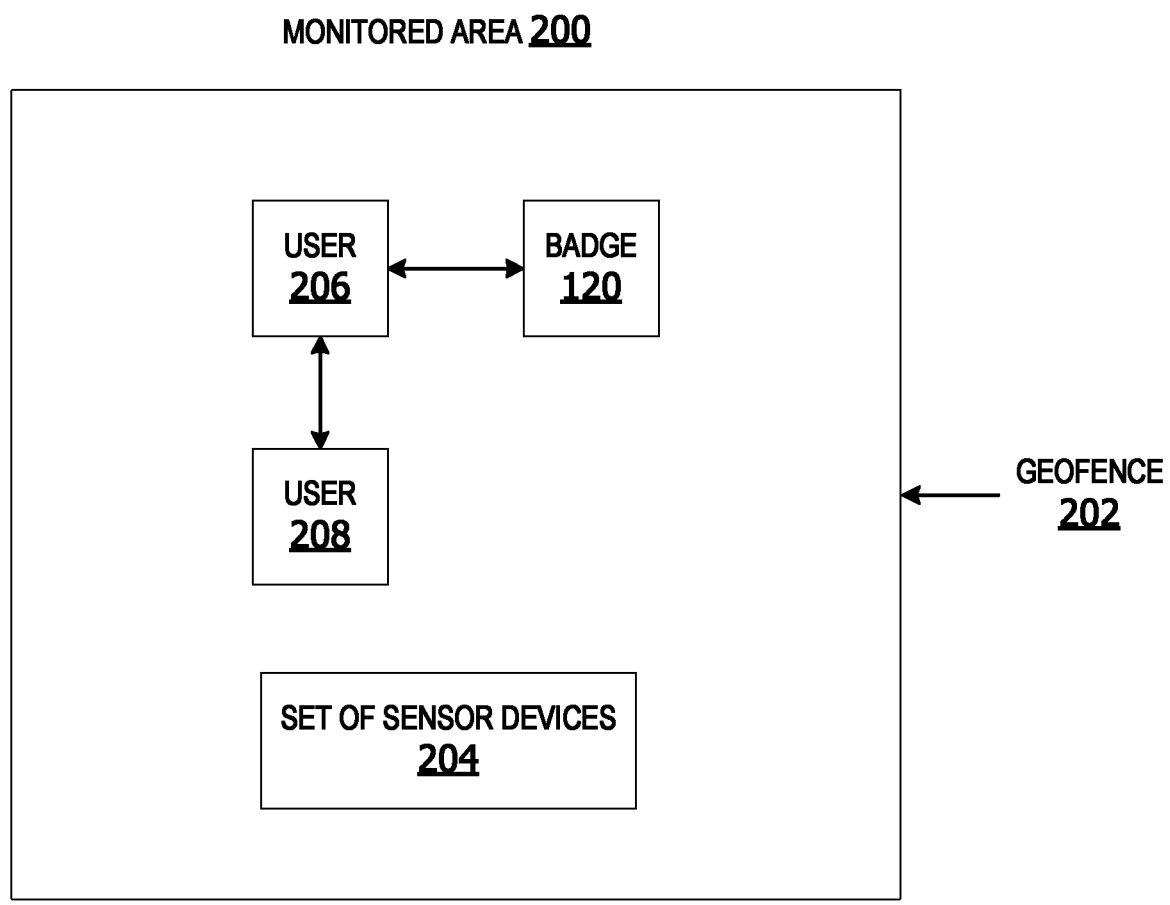
FIG. 2 is an exemplary block diagram illustrating a monitored area.

FIG. 2 is an exemplary block diagram illustrating a monitored area. The monitored area 200 in this example is defined by a geofence 202 and/or a temporal fence. For example, the temporal fence specifies that a set of one or more sensor devices 204 generate sensor data for monitoring interactions between users, such as the user 206 and the user 208, during a given time-period. For example, but without limitation, the temporal fence specifies that sensor data be generated from 9:00a.m. until 5:00p.m. In another example, the temporal fence specifies sensor data be generated between 10:00p.m. and 10:00a.m. The monitored area 200 only exists during the temporal fence time-period. Outside the temporal fence time-period, user interactions are not monitored.

In this non-limiting example, the user 206 is a trainee within a monitored area, such as the user 128 associated with the user device 116 in FIG. 1. The user 206 receives training-related interaction recommendations (instructions) from an interaction recommendation component, such as the interaction recommendation component 134 in FIG. 1. The interaction recommendation component grades/ranks the performance of the user 206 in resolving issues associated with one or more interactions by generating one or more interaction scores. The interaction recommendation component generates the score(s) for the user based on the actions taken by the user 206 during the course of ongoing interaction(s) and also based on the final outcome of those interaction(s). The final outcome of an interaction can include successful resolution of the interaction (problem solved/situation resolved) or unsuccessful resolution of the interaction. Unsuccessful resolution refers to at least one problem associated with the interaction that remains unresolved after termination of the interaction. For example, if the interaction is associated with a user requesting assistance in locating an item, the interaction is successfully resolved when the item or a suitable substitute is successfully located. However, if the sought-after item or a suitable substitute is not located prior to termination of the interaction, the interaction/issue is unresolved.

The set of sensor devices 204 in this example includes one or more sensor devices for generating sensor data, such as an image capture device, microphone, proximity sensors, temperature sensors, biometric sensors to monitor user stress levels, etc. An image capture device can include a still image camera, a video (moving image) camera, an infrared camera, or any other type of image capture device. Biometric sensors can include fingerprint scanners, retinal scanners, facial recognition scanners, heart monitors, blood pressure monitors, body temperature monitors, voice/audio analysis devices, and any other type of biometric sensors.

The set of sensor devices 204 in this example are sensors located within a monitored area, such as sensor devices mounted on a ceiling, floor, walls, shelves, doors, on carts, etc. In other examples, one or more of the sensors in the set of sensor devices 204 are incorporated within a badge 120 worn by the user 208. The sensor devices within the monitored area can include other wearable sensor devices, such as, but not limited to, a fitness tracker. The sensor devices can also include sensor data received from other wearable devices, such as a smart watch, smart glasses, or other devices.

Figure 3:
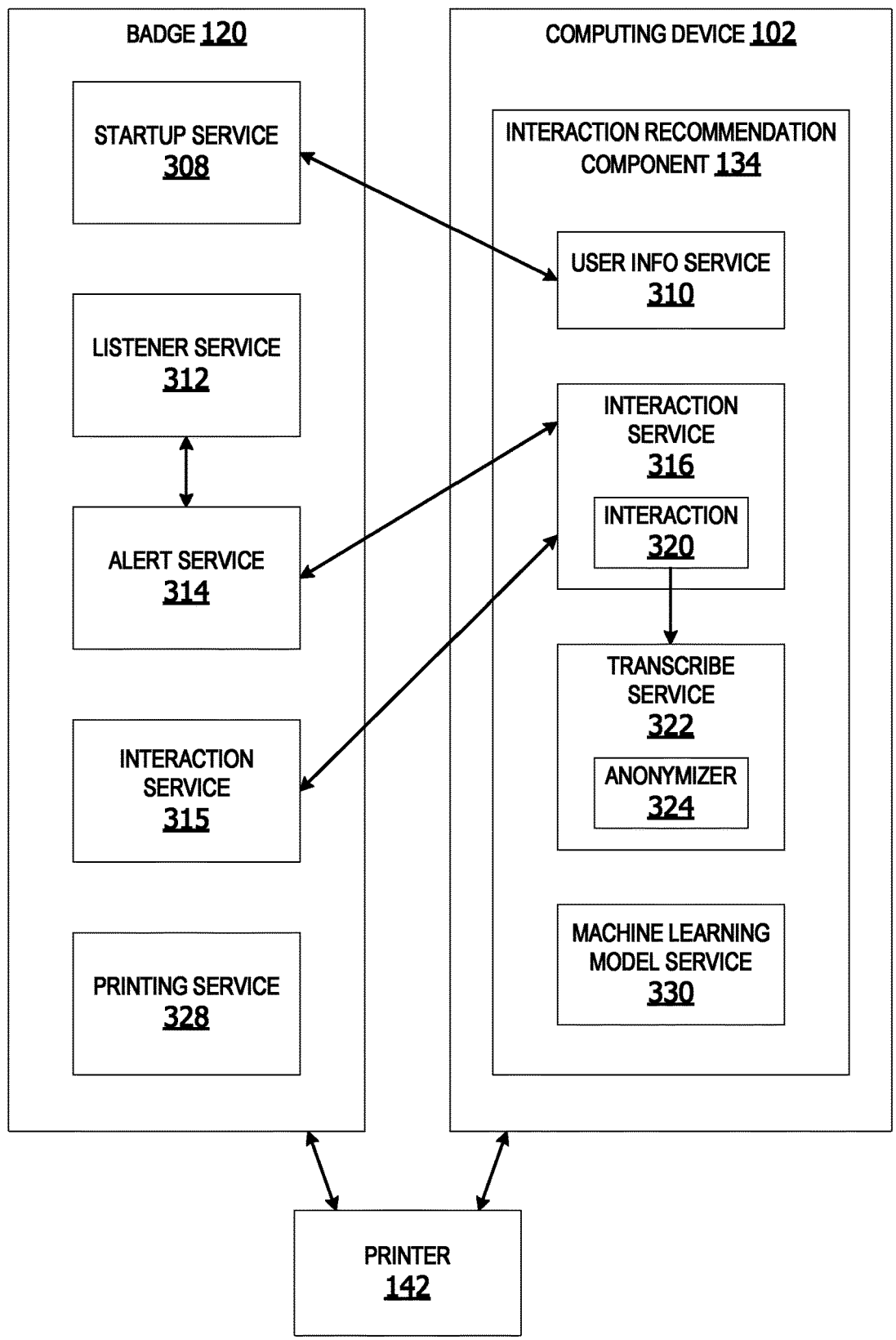
FIG. 3 is an exemplary block diagram illustrating a system including a badge device communicating with an interaction recommendation component via a network connection.

FIG. 3 is an exemplary block diagram illustrating a system 300 including a badge 120 communicating with an interaction recommendation component 134 executing on a computing device 102 via a network connection, such as the network 112 in FIG. 1. The badge 120 is a badge including one or more sensor devices and/or an input/output device.

Each user involved in a training or performing tasks in a monitored area can be issued a badge device. Because every user is different, in some examples, a startup service 308 running on the badge 120 is utilized to calibrate the badge 120 based on the user wearing the badge device. For example, one user naturally speaks in a loud voice while another user normally speaks in a quiet voice. Therefore, it is sometimes necessary to calibrate each badge device to each user's voice, posture, height, biometrics, work areas, work assignments, user identifier (ID), etc.

In some examples, the startup service 308 calls a user information (info) service 310 running on the computing device 102 to obtain data for a particular user. The user data obtained from the information service 310 is utilized during calibration and for analysis of sensor data generated by the badge device. The user information service 310 can provide data inputs such as, but not limited to, user (associate) tenure, biometric calibration data, audio cues, visual cues (body language), and other user-specific data for calibrating a badge device for a specific user.

In other examples, a weighting is used by the interaction recommendation component for analyzing sensor data, including biometric data. For example, the weighting can indicate that increasing volume of a user's voice is more important/receives greater weight than a lengthy silence. In another example, a change in body temperature or increase in blood pressure/heart rate is given greater weight than a change in voice volume.

A listener service 312, in some examples, monitors all sensor data generated by sensor devices embedded within the badge device and/or associated with the badge device using rudimentary scale to simplify calculations. The listener service 312 triggers an alert service 314 to contact a server-side interaction service 316 with queues/details regarding an identified interaction 320 associated with the user wearing the badge 120. The server-side interaction service 318 connects to the client-side interaction service 315 for monitoring the interaction 320 and/or providing additional assistance to the user as indicated by the recommended actions criteria and/or interactions scores.

A transcribe service 322 can generate a transcription of dialogue or portion of a dialogue between two or more users during a transaction, such as a training interaction. An anonymizer 324 anonymizes the transcription by removing personally identifiable information from the transcript. In this manner, the transcription can be utilized for analysis of interactions without identifying the users involved in the interactions.

In some examples, the transcribe service 322 sends a transcription or other data associated with the interaction to another computing device and/or data storage device via the network. In other examples, the computing device 102 sends data, such as an anonymized transcript to an output device, such as, but not limited to, the printer 142 for generating a hard copy (print-out) of the transcript.

In still other examples, the badge 120 includes a printing service 328 enabling the badge 120 to send interaction data, such as transcriptions, sensor data, interactions status, interactions outcome, and other data to an input/output device, such as the printer 142.

A machine learning model service 330 can also update models and/or the recommended actions criteria based on the latest interactions and/or feedback received associated with the latest interactions.

The system in other examples includes a remote call center providing a remote interaction service. The badge 120 and/or the computing device 302 can communicate with the remote call service via the network to obtain updated recommended action criteria, updated score(s), updated interaction status data, and/or additional instructions.

Figure 4:
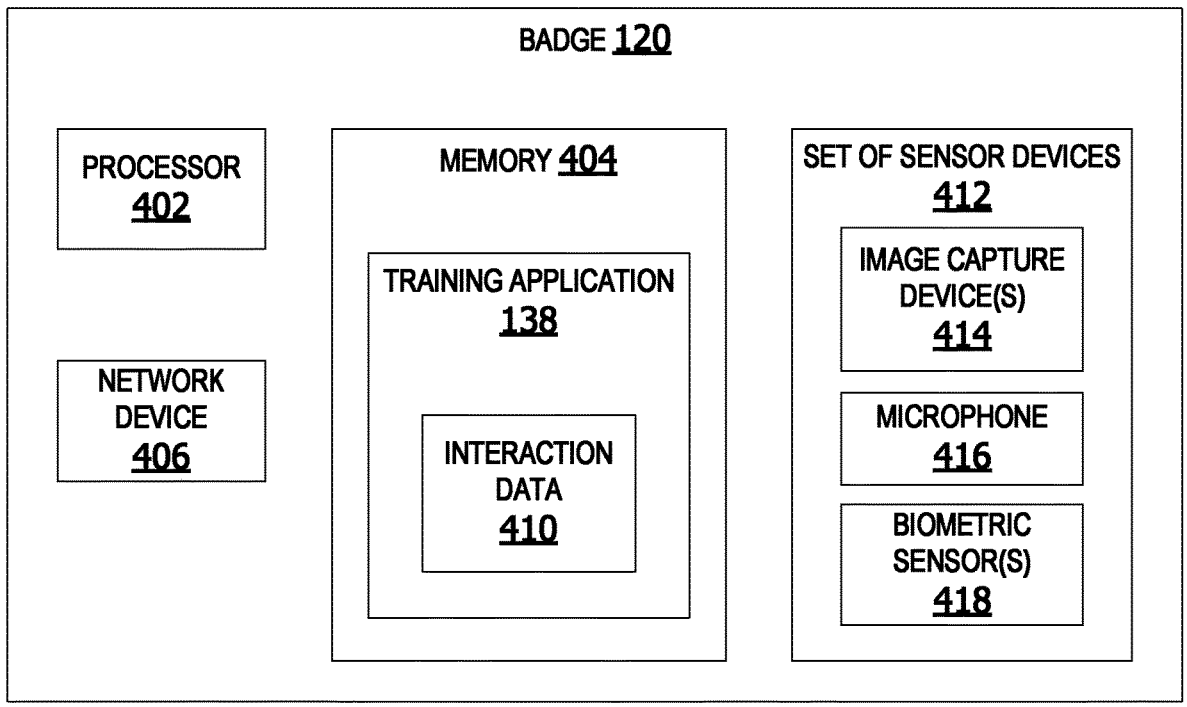
FIG. 4 is an exemplary block diagram illustrating a badge device.

FIG. 4 is an exemplary block diagram illustrating a badge 120. The badge 120 in some examples includes a processor 402, a memory 404, and a network device 406. The processor executes computer-executable code for performing functions on the badge device, such as the training application 138 for generating interaction data 410 associated with one or more interactions associated with the user wearing the badge 120. The interaction data 410 can include anonymized dialogue, date, time, location data, interaction status data, and/or interaction outcome data.

The network device 406 is a device enabling the badge 120 to send and receive data via a network, such as the network 112 in FIG. 1. The network device 406 can include a network card or other device for transmitting data via a wireless network (Wi-Fi), a LAN, an Ethernet, or any other type of network. In some examples, the network device 406 enables the user to utilize the badge device to call for assistance, such as calling a manger, supervisor, janitorial personnel for cleaning spills, technical support, news services, wire feeds, and/or emergency services. Emergency services can include fire department, emergency medical technicians (EMT), police, sheriff, electrical company power outage services, etc.

The badge 120 can also include a set of one or more sensor devices 412, such as an image capture device 414, a microphone 416 for detecting human speech and other sounds, as well as one or more biometric sensor(s) 418. A biometric sensor can include a blood pressure monitor, body temperature monitor, heart beat monitor, or other biometric sensor. For example, the badge 120 can detect heart rate and body temperature of the user wearing the badge 120.

Figure 5:
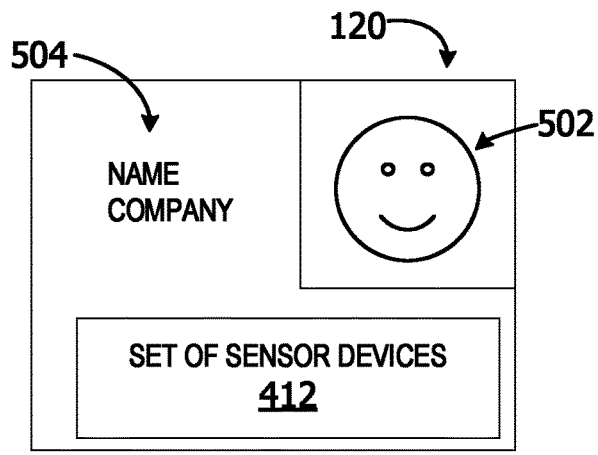
FIG. 5 is an exemplary block diagram illustrating a badge device including one or more sensor devices.

FIG. 5 is an exemplary block diagram illustrating a badge 120 including the set of one or more sensor devices 412. The badge 120 can include an identifying picture 502 of the face of the user wearing the badge, the name 504 of the user, and/or the set of sensor devices 412.

In some non-limiting examples, the sensor data generated by the badge 120 is analyzed by the interaction recommendation component to determine how inexperienced or experienced the user can be with regard to a specific circumstance or set of circumstances associated with an interaction. The circumstances include the state of the environment, problem/issue, number of uses involved in the interaction, and other conditions associated with the interaction.

The information regarding experience level is utilized by the interaction recommendation system to determine when and if assistance should be provided to the user based on the user's level of training, history of dealing with similar situations, etc. The data can also be used to determine whether this associate needs more immediate help with a certain type of situation, to take notes/log incidents of interactions, identify skills and/or training areas in need of improvement, as well as identifying skills/improved performance warranting recognition by training supervisors. The interactions data can also be utilized in other examples to identify users that can be suitable for training others, and/or identifying users for assignment to different shifts. For example, night shift typically involves fewer interactions with other individuals while weekend and/or day shifts involve more interactions between individuals.

Likewise, different areas of a training location and/or different task assignments have different levels of interactions. For example, a task unloading pallets in a storage room or warehouse might involve fewer interactions than answering phones or greeting others. Therefore, trainees showing the best interaction skills can be assigned to these higher interaction-related shifts and tasks, while trainees showing weaker interaction skills can be assigned additional training, assigned to night shifts, and/or assigned to tasks having fewer associated interactions.

Figure 6:
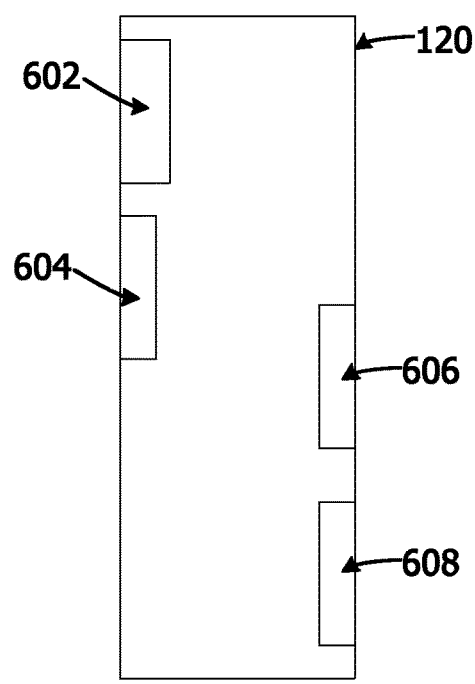
FIG. 6 is an exemplary block diagram illustrating a badge device including a set of sensor devices.

FIG. 6 is an exemplary block diagram illustrating a badge 120 including a set of sensor devices 412. The set of sensor devices 412 in this example includes a microphone 602 for detecting human speech and other sounds, a camera 604 for recording images from the user's perspective/point of view/vantage point, a microphone 606 for detecting heart rate and/or breathing/breath sounds, and a heat sensor 608 for detecting body temperature changes.

In some examples, the badge 120 includes a battery. In other examples, the badge 120 is solar powered via one or more solar panels for converting ambient light/sunlight into solar energy to power the processor, sensor devices, and/or other devices incorporated within the badge device.

In other examples, the badge 120 pairs or syncs with other wearable sensor devices on the user and/or other sensor devices within the monitored area. For example, the badge 120 can receive sensor data generated by a smart watch, smart glasses, a fitness tracker device, or other wearable sensors.

The system analyzes the sensor data, including camera images and audio data, generated from the user's point of view to identify potential issues associated with one or more interactions. The system analyzes the sensor data to identify voice volume, tone of voice, body language, gestures, heart rate, blood pressure, etc. This information is used to gauge potential escalating situations or de-escalating situations by the interaction recommendation component, in some examples.

Figure 7:
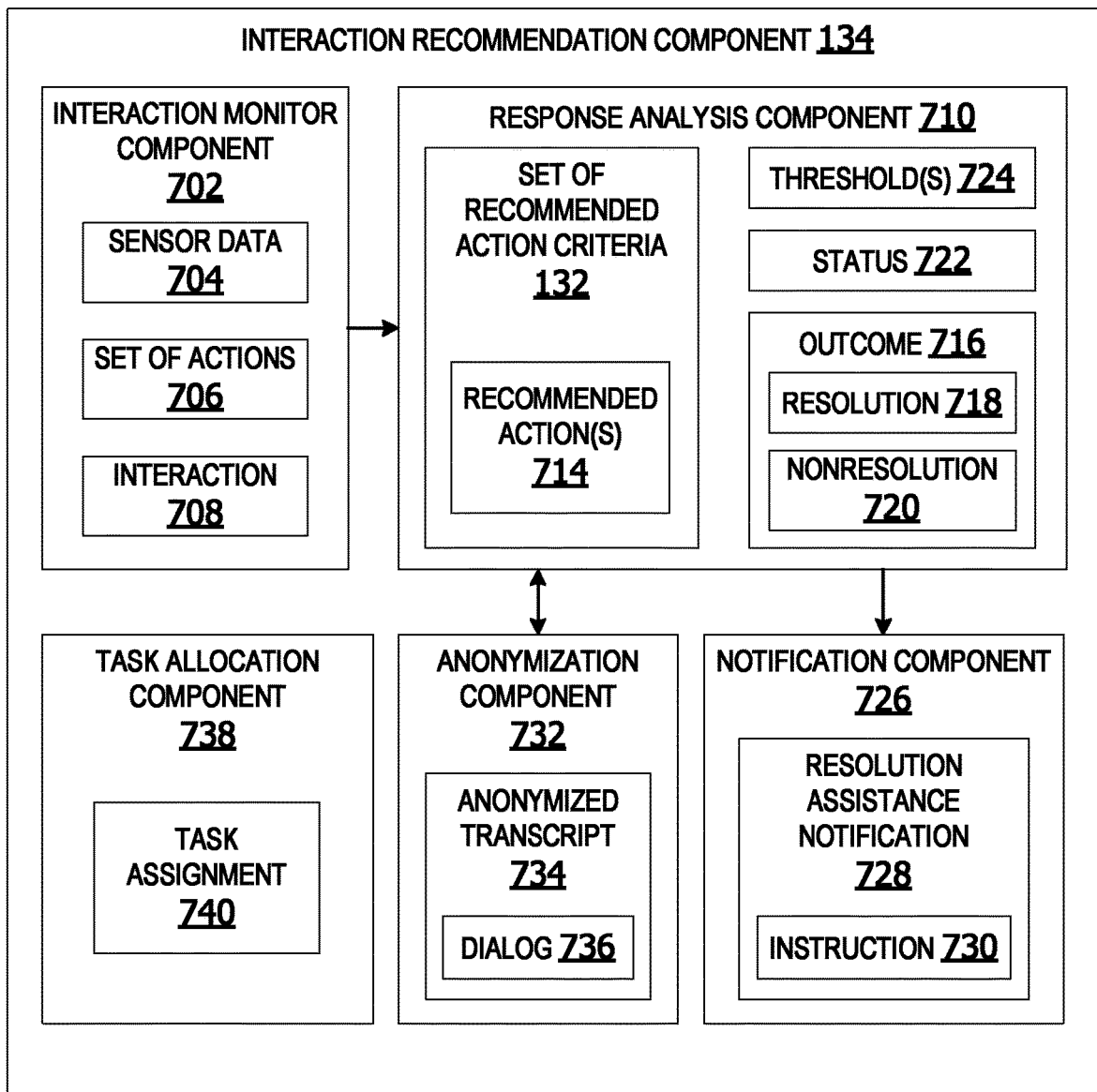
FIG. 7 is an exemplary block diagram illustrating an interaction recommendation component.

FIG. 7 is an exemplary block diagram illustrating an interaction recommendation component 134. The interaction recommendation component in some examples executes on a computing device, such as the computing device 102 in FIG. 1, FIG. 3 and/or FIG. 8. In other examples, interaction recommendation component executes on a cloud server or other remote computing device.

The interaction recommendation component 134 in some examples includes an interaction monitor component 702 identifying an event or situation associated with a first user based on sensor data 704. An event refers to something that happens, such as an occurrence, situation, or a change in a set of circumstances. The event includes an interaction 708 between the first user and at least one other user occurring within a monitored area, such as the monitored area 200 in FIG. 2. The interaction monitor component 702 monitors the interaction 708 between the first user and the at least one other user within the monitored area in real-time to identify a set of actions 706 taken by the first user during the interaction 708.

A response analysis component 710 analyzes the identified set of actions 706 using a set of recommended action criteria 132. The set of recommended action criteria 132 includes one or more recommended action(s) 714 for resolving the same situation or a similar situation associated with the identified event. The response analysis component 710 determines an outcome 716 of the interaction 708. The outcome 716 indicates whether the identified set of actions 706 results in at least one of resolution 718 of the identified event and substantial conformity to a set of recommended action criteria or nonresolution 720 of the event/situation.

The response analysis component 710 can also analyze interaction data to determine a status 722 of the interaction. The status 722 can include a status indicating a resolved/terminated interaction, an unresolved/on-going interaction, an un-changed situation, an escalating situation, a de-escalating situation, or any other status associated with the situation.

The response analysis component 710 retrieves at least one previous interaction score assigned to the first user from a data storage device, such as the data storage device 124 in FIG. 1. If the identified event remains unresolved and the set of actions taken by the user are substantially non-conforming with the set of recommended action criteria, the response analysis component 710 utilizes the interaction score(s) to determine whether to provide additional interaction assistance to the user. The additional interaction assistance can include providing instructions/recommendations to the user via a user device and/or assigning a third user with more experience to assist the first user with solving the problem and concluding the interaction with the second user successfully.

In one example, the response analysis component 710 compares the interaction score with one or more threshold(s) 724. if an interaction score is within an acceptable threshold range, the response analysis component 710 continues monitoring the interaction 708 but does not provide additional assistance. If the interaction score is outside the acceptable range (within an unacceptable threshold range) the response analysis component 710 provides additional assistance to the first user.

A notification component 726 outputs a resolution assistance notification 728 to at least one user device associated with at least one user if the at least one previous interaction score is within an unacceptable score threshold range. The resolution assistance notification 728 includes an instruction 730 provided to the first user. The instruction 730 can be provided in an audio format, a video format, a text format, haptic format, or a combination. For example, the instruction 730 can be provided in an audio and video format, an audio and text format, a video and text format, or a format including audio, video and text instructions. The instruction 730 in video format can include still images or moving images demonstrating a recommended action and/or a proper form or technique for performing a recommended action. The audio format can include speech describing recommended action(s). The text format can include text instructions, such as step-by-step directions or a description of recommended actions.

The instruction 730 in some examples includes one or more recommended actions to be performed by the first user to assist the first user in resolving the identified event. For example, the instruction 730 can recommend the first user make eye contact with the second user and speak in a polite but firm manner. The instructions can be provided via an input/output device, such as, but not limited to, a badge device, an ear piece/ear bud, a microphone, a head set, a user device display screen, or any other type of output device.

In an example, if the trainee is approaching another person or another person is approaching the trainee, the instruction 730 can instruct the trainee to greet the other person when the distance between the trainee and the other user is twenty feet or less. In another example, the system instructs the trainee to greet the other person when the other person is ten feet away or less. The instruction can include a recommended greeting (script), such as, "Hello, how can I help you?" or "Hello, what can I do for you?". In still another example, the system can instruct the trainee to say "Hello, can I help you find something?" if the other person is scanning signage associated with one or more shelves/displays.

An anonymization component 732 in some examples generates an anonymized transcript 734 of dialogue 736 between the first user and the second user occurring during the interaction 708. The anonymized transcript excludes identifying data associated with the first user and/or the second user.

Figure 8:
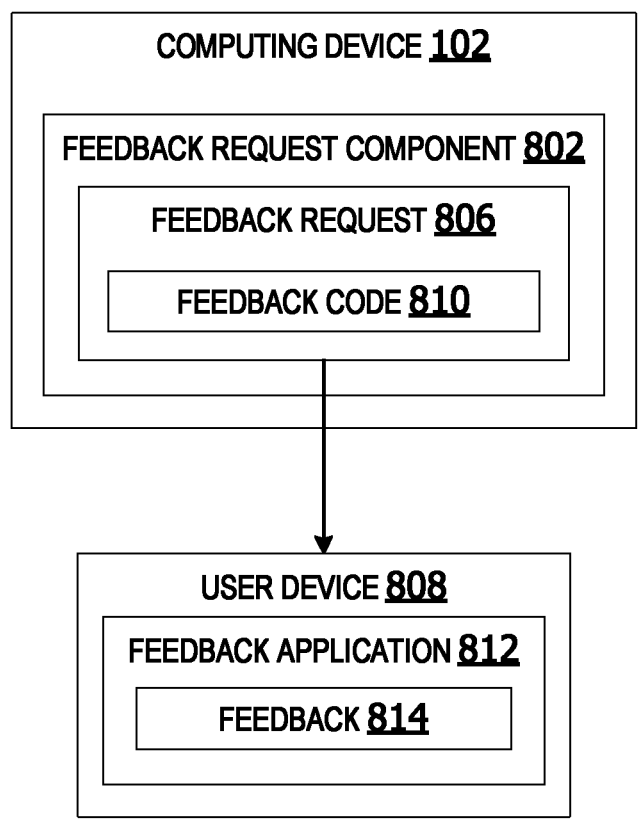
FIG. 8 is an exemplary block diagram illustrating a feedback request component.

A task allocation component 738 assigns a third user to assist the first user in de-escalating the situation associated with the identified event or resolving the situation associated with the identified event. The task assignment 740 is an assignment or re-assignment directing the third user to go to the first user's location and provides assistance. The third user in some examples is a user having greater experience resolving situations of a same or similar type as the situation associated with the current situation/event. For example, if the interaction is associated with accepting a returned item, the third user assigned to assist can be a user having previous experience FIG. 8 is an exemplary block diagram illustrating a feedback request component 802 executing on the computing device 102. The feedback request component 802 outputs a feedback request 806 to a user device 808 associated with a second user. The user device is a computing device, such as, but not limited to, the user device 116 and/or the user device 118 in FIG. 1.

The feedback request 806 includes a feedback code 810 enabling the second user to access a feedback application 812 for providing feedback 814 regarding interactions with other users and/or resolution of the identified event associated with the second user.

Figure 9:
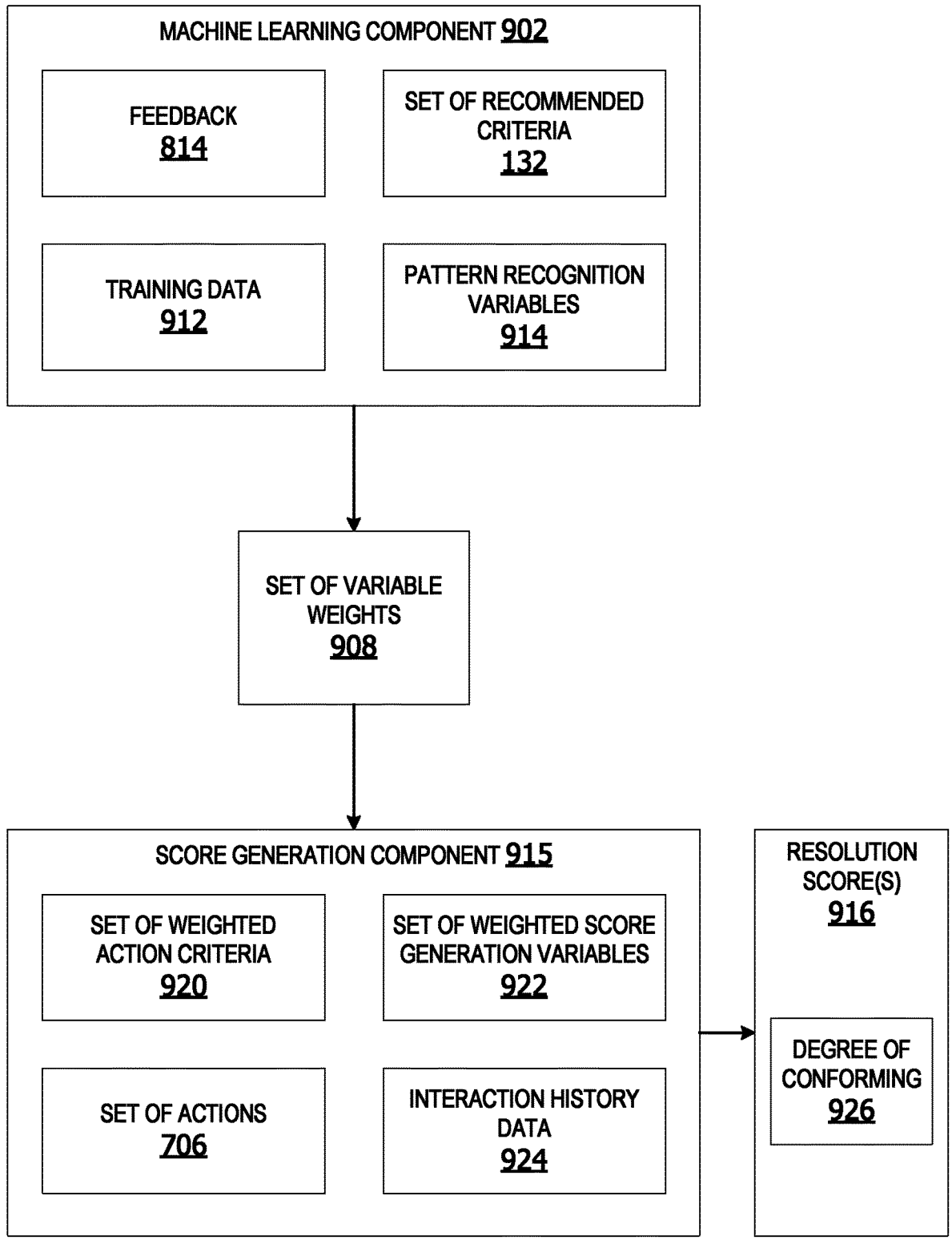
FIG. 9 is an exemplary block diagram illustrating a machine learning component.

FIG. 9 is an exemplary block diagram illustrating a machine learning component 902. The machine learning component 902 obtains feedback 814 from a plurality of sources, such as, but not limited to, one or more users associated with one or more interactions that occurred within the monitored area. The machine learning component 902 analyzes the feedback 814 with the set of recommended action criteria 132 to generate a set of variable weights 908 using training data 910 and pattern recognition variables 914. The variable weights are utilized by the score generation component 915 to calculate one or more interaction score(s) for one or more users based on the set of actions 706 taken by the first user to resolve the identified event.

In some examples, the score generation component 915 combines the set of variable weights 908 with a set of recommended action criteria to generate a set of weighted action criteria 920. In other examples, the score generation component 915 combines the set of variable weights 908 with a set of score generation variables to generate a set of weighted score generation variables 922. The set of weighted score generation variables 922 can be utilized with interaction history data 924 and the set of actions 706 to generate one or more interaction score(s) 916. The interaction score(s) 916 indicate a degree of conformity 926 with recommended actions in the set of recommended action criteria 132.

Figure 10:
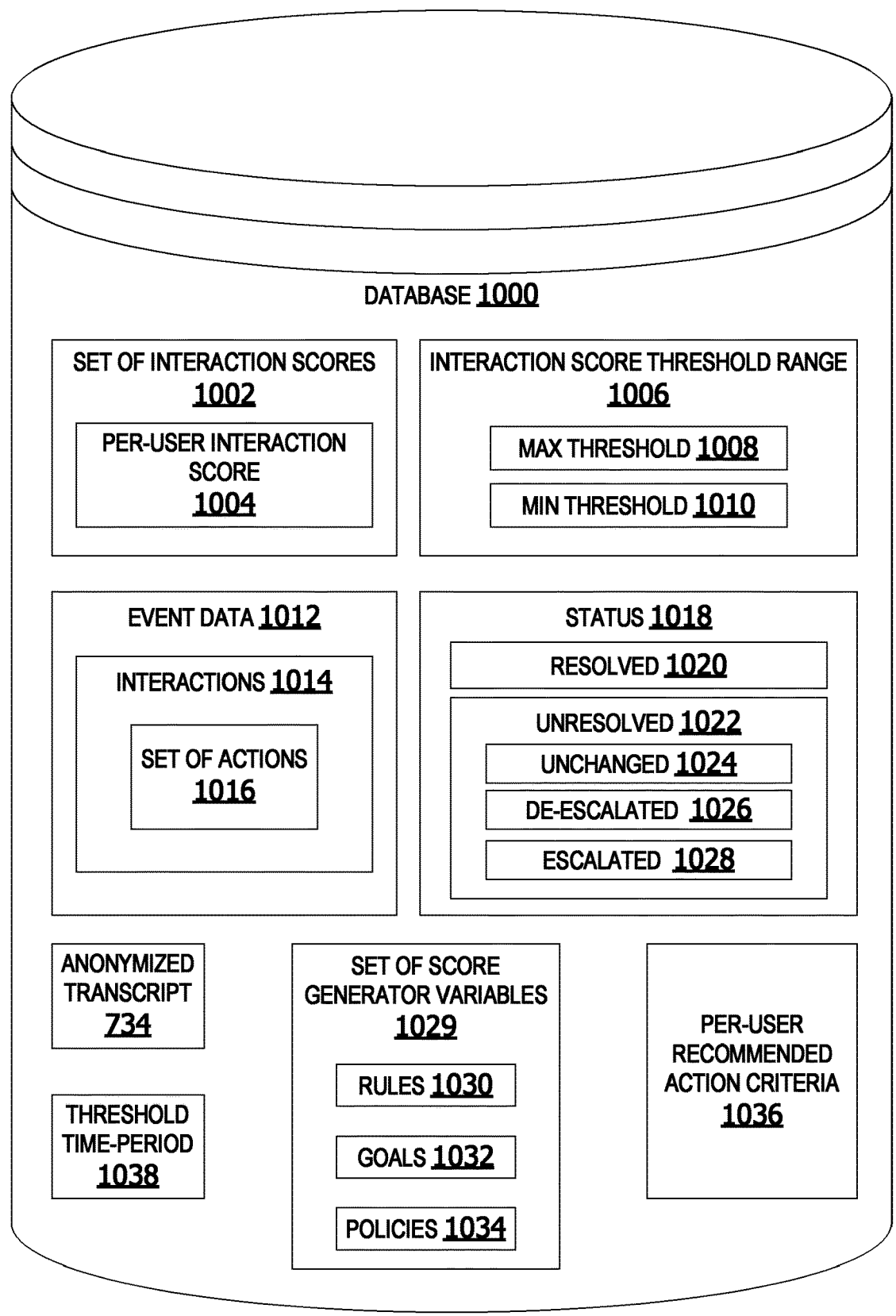
FIG. 10 is an exemplary block diagram illustrating a database.

FIG. 10 is an exemplary block diagram illustrating a database 1000. The database 1000 stores (saves) interaction-related data, such as, but not limited to, a set of one or more interaction scores 1002, including at least one per-user interaction score 1004. The per-user interaction score 1004 can be an aggregate interaction score indicating a degree of conformity of actions taken during a plurality of interactions with recommended action criteria. In other words, the user can be assigned a single score ranking the user's actions taken during all monitored interactions.

The per-user interaction score 1004 in other examples is a per-interaction score ranking a degree with which user actions taken during a single interaction conforms with recommended action criteria. In this example, the user receives a new score for each new monitored interaction.

In yet other examples, the per-user interaction score 1004 is an aggregate score indicating a ranking for user actions taken during one or more interactions of a similar type or in the same category of interaction/situation. For example, the score can be a score for all interactions in situations involving assisting another user in locating an item in a storeroom, warehouse or other area. In another example, the score includes a ranking of the user's actions during all interactions in training exercises involving item returns or exchanges. Other types of category specific interaction scores can include a disturbance-related interaction score, an injury assistance-related interaction score, missing item recovery-related interaction score, an item return-related interaction score, a complaint resolution-related interaction score, a price check-related interaction score, etc.

In still other examples, the per-user interaction score 1004 is an average interaction score. In this example, two or more interaction scores are averaged together to generate the average interaction score.

An interaction score threshold range 1006 is a range of score values. The interaction score threshold range 1006 can include a maximum (MAX) threshold 1008 score value and/or a minimum (MIN) threshold 1010 score value.

A threshold range can be an acceptable interaction score threshold range. Any score falling within an acceptable threshold range is a score indicating substantial compliance with recommended action criteria. For example, if the acceptable threshold score range is a range from fifty to one-hundred, an interaction score of fifty-eight indicates substantial conformity with the recommended action criteria.

If a score is within an acceptable range, it indicates the user has successfully resolved this type of situation or a similar situation one or more times in the past. Therefore, the user is given more leeway to continue handling the situation based on the user's experience and good track record.

In other examples, the interaction score threshold range 1006 is an unacceptable threshold score range. Any score falling within the unacceptable threshold score range is a score indicating substantial nonconformity with recommended action criteria. For example, if the unacceptable score threshold range is a range between zero five, the user's interaction score indicates substantial nonconformity with the recommended action criteria if the score has a value of five or less.

If a user has an unacceptable score, the system provides assistance to the trainee (user) more quickly due to the trainee's poor track record or lack of experience in dealing with the current type of situation or similar situation. The system recognizes the lack of experience as an indicator that help should be provided more readily than with a more experience user.

Generating interaction scores which are compared to threshold values to determine whether to provide additional assistance to a user or allow the user to continue without assistance is more computationally efficient because the score values and threshold values can be quickly and easily compared to enable timely and accurate decision-making regarding provision of assistance. Moreover, the system recognizes situations requiring assistance more quickly and accurately than human users wherein the system is monitoring multiple interactions occurring everywhere within a potentially vast monitored area. This reduces manpower required for user training and improves recognition of training successes and deficits customized on a per-user basis.

The database 1000 can include event data 1012 associated with one or more stress-related events. The event data 1012 describes one or more interactions 1014, including a set of actions 1016 taken by at least one user during at least one interaction.

An interaction status 1018 for one or more interactions can be stored. The status 1018 can include a resolved 1020 status indicating an interaction is concluded/ended. An unresolved 1022 status indicates the interaction is still on-going. An unresolved interaction can be unchanged 1024 since a last status update, de-escalated 1026 or escalated 1028.

In some examples, the database 1000 stores a set of score generation variables 1029. Score generation variables 1029 include one or more rules or parameters for generating an interaction score. The score generation variables can include rules 1030, goals 1032, and/or policies 1034 utilized for determining a score for a given interaction.

For example, if goals 1032 include assisting users in finding/locating one or more items, the set of score generation variables can indicate a very high (positive) score for a user that consistently is able to help users find items quickly and correctly. Likewise, the set of score generation variables 1029 can indicate generation of a poor (low) score for a user that consistently is unable to help users locate items in a timely manner.

In some example, each user is assigned a customized set of per-user recommended action criteria 1036. The set of per-user recommended action criteria includes criteria from the set of recommended action criteria 132 customized for a specific user (trainee).

For example, the customized set of per-user recommended action criteria 1036 can specify that a user that normally does not smile be reminded to smile during interactions with others. Likewise, a user that normally speaks in a very loud voice can be assigned a customized set of per-user recommended action criteria 1036 that has a normal/unstressed voice volume level calibrated to that particular user's normal voice volume, which can be considerably louder than the normal/unstressed voice volume level for other users.

The interaction recommendation component in some examples is a learning model that updates recommended action criteria on a per-user basis, fine-tuning the criteria for each individual based on the feedback received, scores, manual requests for assistance made by users, types of assistance provided, number of interactions, outcomes, etc.

The database 1000 can also store a threshold time-period 1038. If the time during which an interaction remains unresolved exceeds the threshold time-period, the system automatically provides interaction-assistance to the user. This prevents a situation from dragging out for an unreasonable or inconvenient amount of item. This further ensures problems or other issues are resolved quickly and efficiently with a minimal of delay.

An anonymized transcript 734 can also be stored (recorded) on the database 1000. The anonymized transcript 734 is a transcript of at least a portion of a dialogue between two or more users within a monitored area. In some examples, the dialogue is a conversation taking place during a training example or training simulation in which a user is being trained in various ways to solve problems and address issues which can come up during a regular work day.

In some examples, an anonymized transcript is used in training examples provided to trainees or utilized by trainers/managers and other personnel for trainings at other training locations. The anonymized transcripts can also be used to protect privacy of individuals. In some examples, anonymized transcripts are only used at training locations other than the training location at which the transcribed interaction occurred to further prevent identification of parties involved in the interactions. For example, each transcript can be identified by a training location number. The transcripts are then used for training at training locations having a different location number to ensure the anonymized transcripts are only used at remote location from the location at which the dialogue occurred. This enables transcripts to be used by a single location or multiple locations as a training tool.

FIG. 11 is an exemplary block diagram illustrating a set of recommended action criteria 132. The set of recommended action criteria 132 includes one or more recommended actions 714 associated with one or more situations, events, problems, issues, situations, or other circumstance. For example, the recommended actions 714 can include actions such as remaining calm with uncrossed arms in a relaxed posture with relaxed/open hands not clenched in fists so that the user's body language will encourage positive interactions between uses. Still other recommended actions can include standing within a reasonable distance (not too close) or physical proximity, avoid physical contact, etc.

The recommended actions 714 in other examples is a model response for a given situation includes one or more actions, such as make eye contact with other user, mirror/repeat back what the other person says, and listening to encourage understanding and rapport between users during interactions. Other recommended actions 714 can include polite language, such as saying "please", "thank you", and "you're welcome". Other suggested phrases can include "may I help you", "is there anything else I can do for you", and/or "have a nice day."

Figure 12:
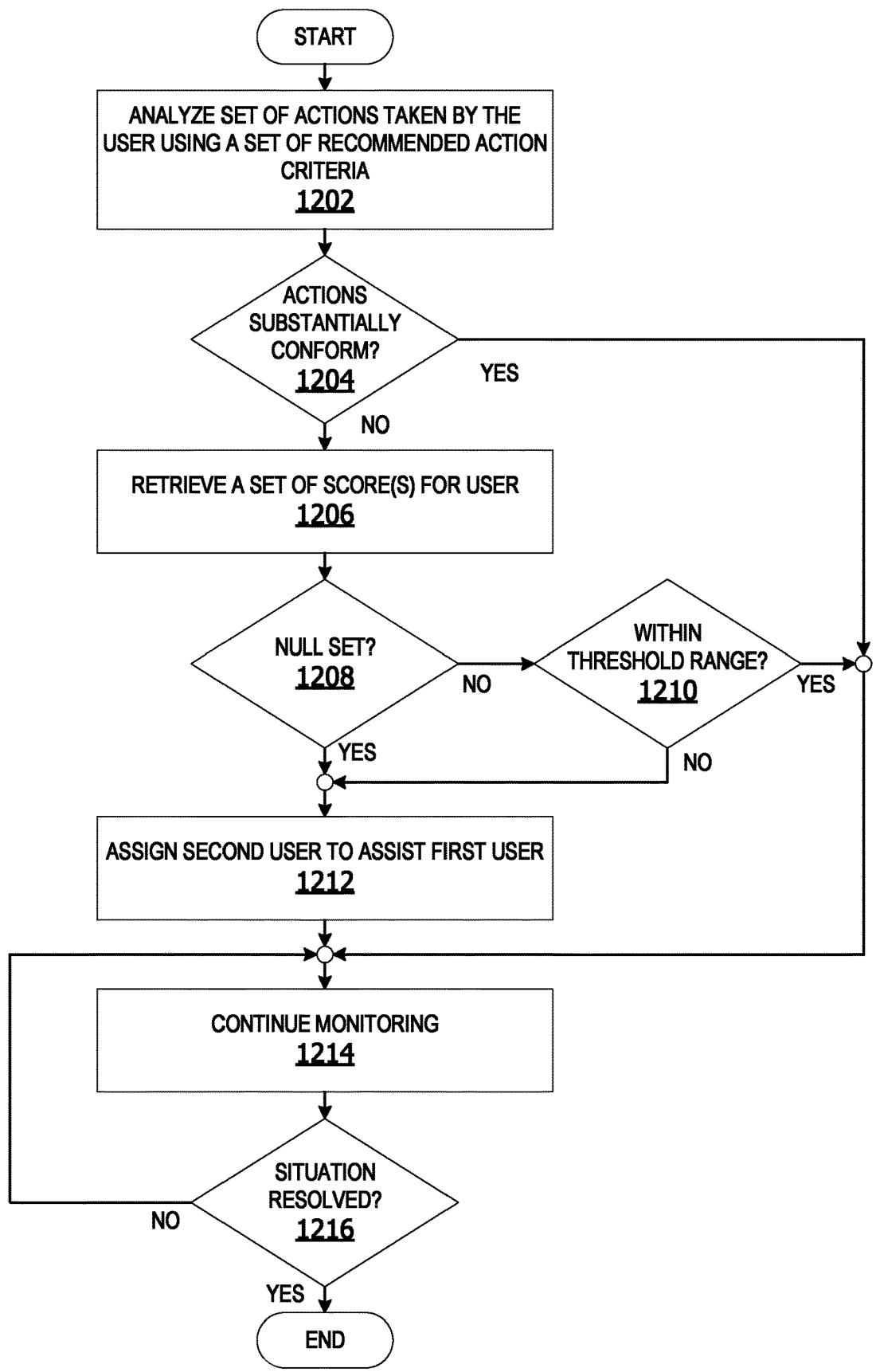
FIG. 12 is an exemplary flow chart illustrating operation of the computing device to provide interactions-related assistance.

FIG. 12 is an exemplary flow chart illustrating operation of the computing device to provide interactions-related assistance. The process shown in FIG. 12 can be performed by an interaction recommendation component, executing on a computing device, such as the computing device 102 in FIG. 1, FIG. 3 and/or FIG. 8.

The process begins by analyzing a set of actions taken by a user using a set of recommended action criteria at 1202. The set of actions is a set of one or more actions taken by the user, such as the set of actions 918 in FIG. 9, and the set of actions 1016 in FIG. 10. The set of recommended action criteria 134 is a set of one or more rules for determining whether the user's actions are conforming or nonconforming.

The interaction recommendation component determines if the set of actions substantially conform to the set of recommended action criteria at 1204. If yes, the interaction recommendation component continues monitoring until the situation is resolved at 1218. The process terminates thereafter.

Returning to 1204, if the actions are not substantially conforming, the interaction recommendation component retrieves a set of one or more interaction score(s) for the user at 1206. The score(s) can be retrieved from a data storage, such as the data storage device 124 in FIG. 1 and/or the database 1000 in FIG. 10. The interaction recommendation component determines if the set of interaction score(s) is a null set at 1208. If no, the interaction recommendation component determines if the score(s) are within a threshold acceptable score range. If yes, the interaction recommendation component continues monitoring at 1216 until the situation is resolved at 1218. The process terminates thereafter.

If the set of score(s) is a null set at 1208 or if the set of score(s) is not within an acceptable threshold range at 1210, the interaction recommendation component assigns a second user to assist the first user at 1212. The interaction recommendation component continues monitoring the interaction at 1216. The interaction recommendation component determines if the situation is resolved. If no, the interaction recommendation component continues monitoring at 1214 until the situation is resolved at 1216. The process terminates thereafter.

While the operations illustrated in FIG. 12 are performed by a computing device, aspects of the disclosure contemplate performance of the operations by other entities. For example, a cloud service can perform one or more of the operations.

Figure 13:
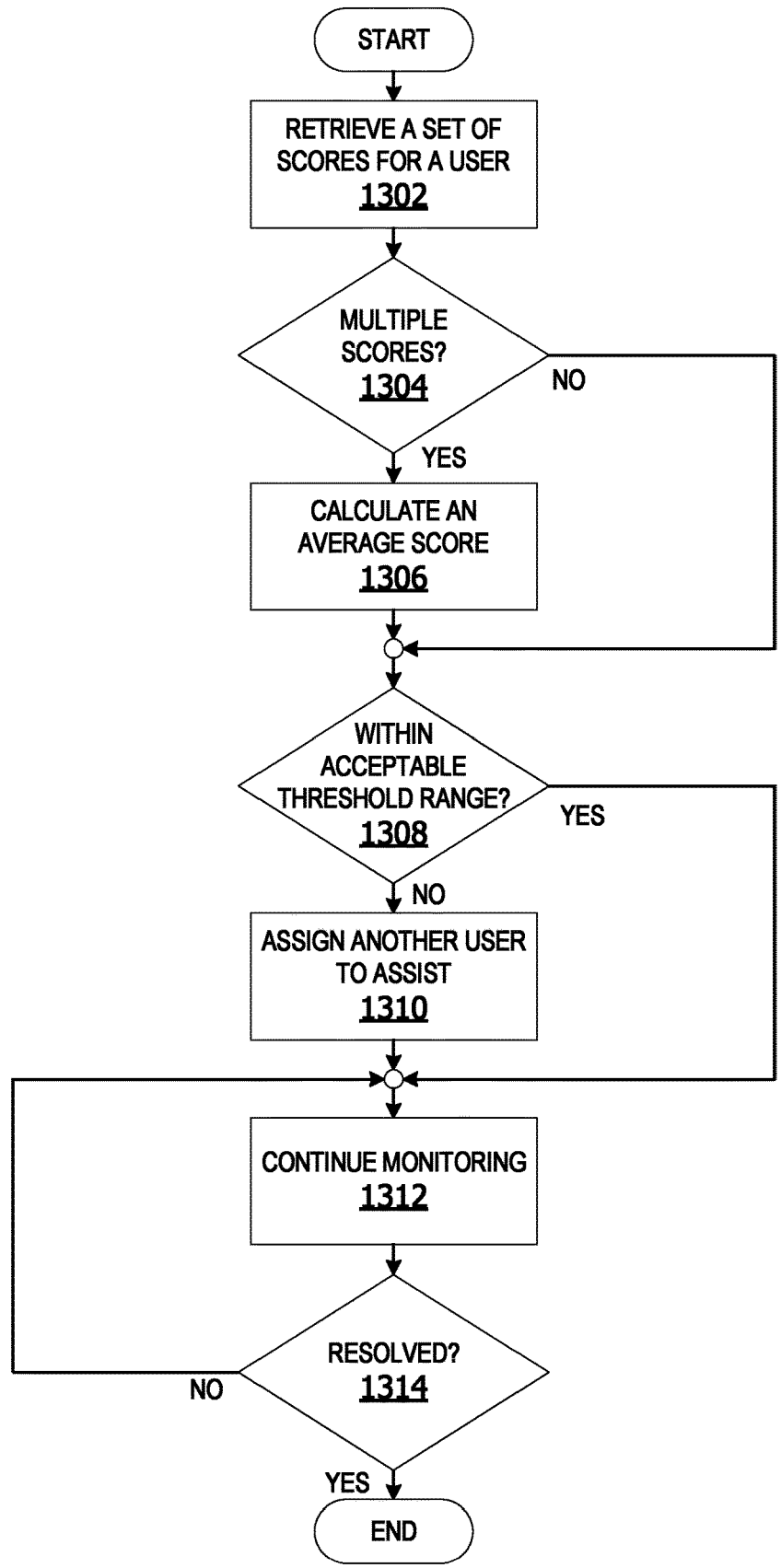
FIG. 13 is an exemplary flow chart illustrating operation of the computing device to utilize interaction score(s) to determine whether to provide interaction-related assistance.

FIG. 13 is an exemplary flow chart illustrating operation of the computing device to utilize interaction score(s) to determine whether to provide interaction-related assistance. The process shown in FIG. 13 can be performed by an interaction recommendation component, executing on the computing device 102 in FIG. 1, FIG. 3 and/or FIG. 8.

The process begins by retrieving a set of interaction scores for a user at 1302. The set of interactions scores is a set of one or more interaction scores, such as, but not limited to, the one or more interaction score(s) 126 in FIG. 1, the one or more interaction score(s) 916 in FIG. 9, and/or the set of interaction scores 1002 in FIG. 10.

The interaction recommendation component determines if the set of scores includes multiple scores at 1304. If yes, the interaction recommendation component calculates an average score at 1306. The interaction recommendation component determines if the score is within an acceptable threshold range at 1308. If no, the interaction recommendation component assigns another user to assist the first user at 1310. The interaction recommendation component continues monitoring the interaction at 1312. The interaction recommendation component determines if the issue associated with the interaction is resolved at 1314. If no, the interaction recommendation component continues monitoring the interaction until the issue is resolved at 1314. The process terminates thereafter.

While the operations illustrated in FIG. 13 are performed by a computing device, aspects of the disclosure contemplate performance of the operations by other entities. For example, a cloud service can perform one or more of the operations.

Figure 14:
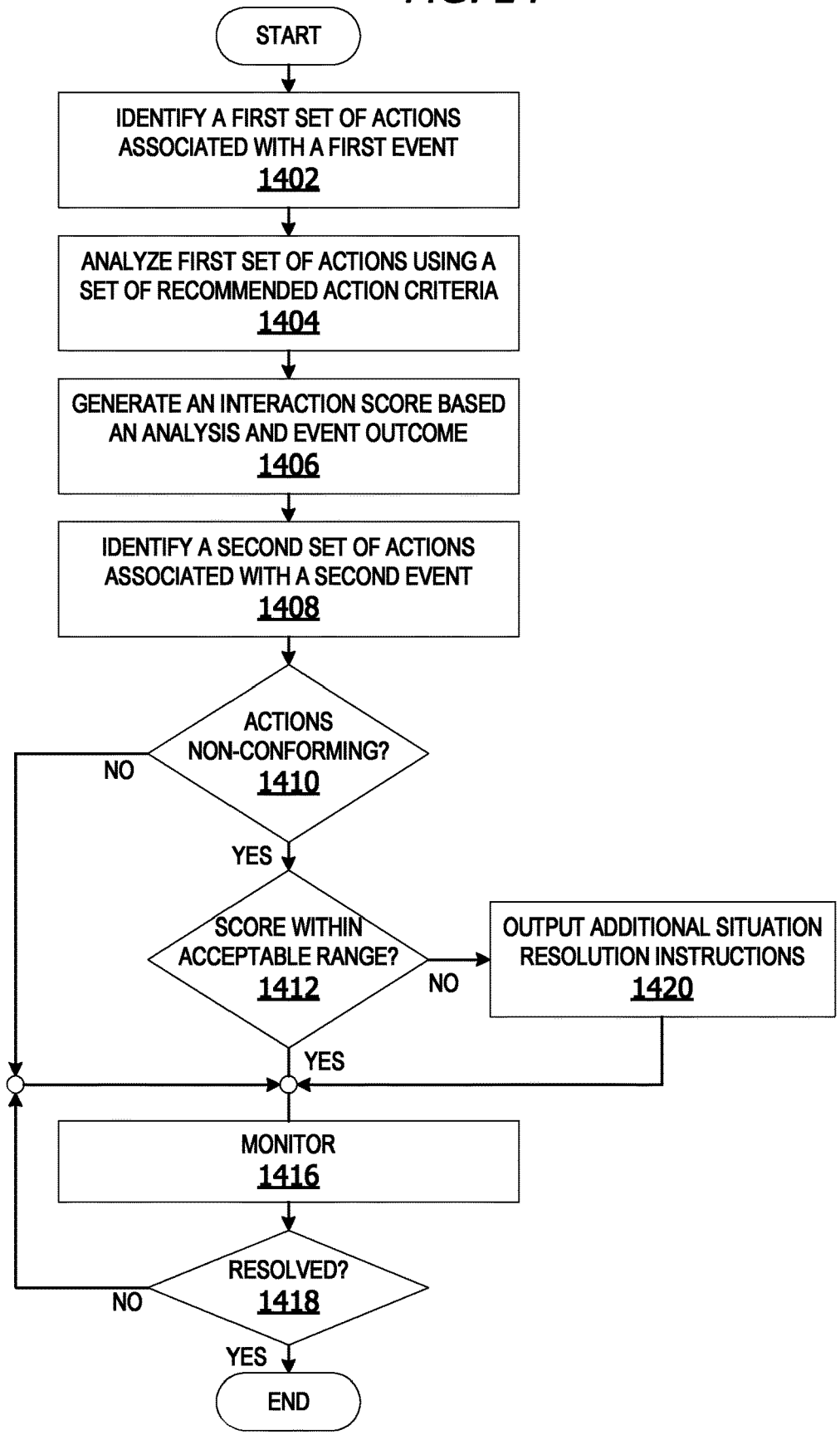
FIG. 14 is an exemplary flow chart illustrating operation of the computing device to monitor interactions associated with a user.

FIG. 14 is an exemplary flow chart illustrating operation of the computing device to monitor interactions associated with a user. The process shown in FIG. 14 can be performed by an interaction recommendation component, executing on a computing device, such as the computing device 102 in FIG. 1, FIG. 3 and/or FIG. 8.

The process begins by identifying a first set of actions associated with a first event at 1402. The interaction recommendation component analyzes the first set of actions using a set of recommended action criteria at 1404. The interaction recommendation component generates an interaction score based on the analysis and an event outcome at 1406. The interaction recommendation component identifies a second set of actions associated with a second event at 1408. The interaction recommendation component determines if the second set of actions are non-conforming at 1410.

If the actions are non-conforming at 1410, the interaction recommendation component determines if an interaction score for the user is within an acceptable threshold range at 1412. If yes, the interaction recommendation component continues monitoring the interaction at 1416. The interaction recommendation component determines if the situation is resolved at 1418. If no, the interaction recommendation component continues monitoring until the situation is resolved at 1418. The process terminates thereafter.

Returning to 1414, if the score is not within an acceptable threshold range, the interaction recommendation component outputs additional situation resolution instructions at 1420. The interaction recommendation component continues monitoring the interaction at 1416. The interaction recommendation component determines if the situation is resolved at 1418. If no, the interaction recommendation component continues monitoring until the situation is resolved at 1418. The process terminates thereafter.

Returning to 1410, if the second set of actions conform with the recommended action criteria, the interaction recommendation component continues monitoring the interaction at 1416. The interaction recommendation component determines if the situation is resolved at 1418. If no, the interaction recommendation component continues monitoring until the situation is resolved at 1418. The process terminates thereafter.

While the operations illustrated in FIG. 14 are performed by a computing device, aspects of the disclosure contemplate performance of the operations by other entities. For example, a cloud service can perform one or more of the operations.

Additional Examples

In some examples, sensor devices incorporated within a badge device begin recording sensor data during interactions within a monitored area when a trainee or other user wearing the smart badge device enters the monitored area. An interaction triggers sending interaction data to an interaction recommendation component on a remote computing device. When the interaction ends, a feedback request, including a link to a feedback application, is sent to a user device associated with the one or more users involved in the interaction requesting feedback associated with the interaction. The feedback request can include an identifier, such as a barcode or quick response (QR) code which can be used to provide the feedback. The QR code can be printed out on a printer device in some examples.

In one example, the system starts with a badge equipped with a small camera, microphone, and an ear piece linked with the badge. The system with the badge uses time fencing, geo-fencing and a physical button for determining times and places where to record/monitor user interactions. The badge in this example includes a physical button which can be pressed or activated by the user to request assistance. This button will trigger communication with a trainer (management associate) or artificial intelligence (machine learning component) whose purpose is to coach the trainee through various training situations. The system with the badge is listening for teachable moments via key words and decibel levels. Depending on the experience/tenure of the trainer, the system sensitivity can be adjusted. The system allows for handling those teachable moments at the time they occur via remote assistance. This improves quality of interactions during training by improving the accuracy of feedback provided to trainees and availability of real-time assistance to trainees during the course of training scenarios (in real-time during interactions).

In one example, the system evaluates a trainee based on body language, tone of voice, volume of voice, words spoken, etc. The system evaluates the environment to determine the circumstances surrounding the interaction. The state of the environment can include a degree of crowding/congestion in the area, temperature (hot or cold), floor condition (wet or dry), air quality (clear, cool, smoky), condition of shelves (fully stocked, partially stocked, empty), etc. The system evaluates the situation to determine a best/recommended response, including recommended actions based on rules, policies, procedures, safety regulations, etc. The system compares the user's actual actions taken with the recommended actions included in the generated model response.

If the trainee's actions fail to conform to the recommended actions, the system sends instructions recommending additional actions or changes in actions to improve the interaction/resolve any issues or problems associated with the issue. The system scores the associate based on the way the associate handled the situation when the situation is resolved, the length of the occurrence, the time of the occurrence, the location of the occurrence, the seriousness of the occurrence, etc.

In some examples, if the situation is on-going and failing to resolve or de-escalate, the system automatically sends another more experienced user to assist and/or the system sends instructions to facilitate successful conclusion of the interaction.

The system in other examples can include assistance center/call center that includes communication devices used by experienced trainers, managers or supervisors. This enables experienced trainers, managers or supervisors currently absent from the training area due to illness, travel, and/or physical limitations, to continue using their knowledge and experience to train/guide others. This gives trainers the ability to respond to teachable moments live to give direct coaching through live video.

The assistance line can be equipped with the interaction recommendation component running on a computing device to utilize artificial intelligence for handling common situations or where a human user is unavailable. The system can include live video output to the user(s) participating in a training interaction. This permits a first user (trainee) receiving assistance to see a video image of the remote user that is providing the recommendations/advice for resolving the issue(s). The system provides automated instructions upon detection of keywords or phrase with the use of voice recognition.

The system provides real-time assistance to trainees by analyzing a live conversation. The system provides quick search results to an associate or other user in other examples. For example, the system can parse conversations to detect keywords using voice recognition. The system automatically searches for helpful information for the remote user based on the detected keywords parsed from the live conversation. The search results are displayed on a user device screen so that the user has immediate access to helpful information. Common questions for assistance would include "Do you have x?" or "Do you know where I can find y?". The system focuses on solving these common questions/issues.

In some examples, the interaction recommendation component analyzes sensor data to determine when a situation is escalating beyond a trainee's control/experience level. The interaction recommendation component can recognize a situation sooner than a human trainer. Moreover, the interaction recommendation component continuously monitors multiple interactions simultaneously where there can only be a couple trainers on duty at a training location with numerous trainees currently in training. The interaction recommendation component notifies trainers/managers when they need to start monitoring/get involved, without having to monitor all associates all the time. This provides a more efficient and accurate assessment of when assistance is needed.

In some examples, a badge device allows a user (trainee) to trigger a physical switch or button to request assistance. The interaction recommendation component utilizes incidents of manual requests for assistance as feedback to the machine learning component to fine-tune the recommended action criteria and fine-tune provision of assistance to the user in the future.

The feedback can indicate that a situation that was failing to resolve was successfully resolved after the system sent additional instructions to the user (trainee) and/or after another user was sent to assist. Next time, the machine learning enables the system to recognize the need to provide the instructions and/or additional user assistance more quickly/with shorter wait time for improved response time and increased user satisfaction.

The interaction recommendation component in other examples analyzes sensor data to recognize posture of weapon drawn, detect sounds of weapon fire, or phrasing of hostile situation. The interaction recommendation component automatically flags the recording for transfer to emergency services, alert emergency personnel, and/or output emergency procedure instructions to users.

The interaction recommendation component can monitor multiple trainees in real-time in multiple locations where a single human trainer/supervisor or manager would be unable to do so. Moreover, the interaction recommendation component can provide information to a trainee in response to the trainee's response to a training question/scenario in real-time without the trainee wearing the badge requesting that information.

For example, if a trainer asks the trainee (user) where a product is located, the interaction recommendation component provides that information to the trainee in real-time as soon as the question is asked without the trainee needing to ask for the answer/assistance. In another example, if the interaction recommendation component detects a trainer/supervisor asking if something is in-stock, the interaction recommendation component provides the answer (in stock at another location, can be reserved for you, can be ordered, etc.) via the speaker in the badge, the trainee's ear piece, the user device associated with the trainee, or via some other input/output device associated with the trainee user.

Location-awareness of badges and system can identify proximity of more experienced or "expert" user nearby to assist a user with an interaction. The system sends in-person help in lieu of electronic help sent in the form of instructions/information.

Alternatively, or in addition to the other examples described herein, examples include any combination of the following:
- a score generation component, implemented on the at least one processor, that generates a per-event interaction score associated with the identified event, wherein the per-event interaction score indicates a degree with which the set of actions taken by the first user to resolve the situation conforms with the set of recommended action criteria;
- a smart badge associate with the first user, wherein the smart badge comprises at least one of a camera, a microphone, and a biometric sensor;
- a geofence and a temporal fence associated with the interaction monitor component, wherein the geofence comprises a set of geographical boundaries defining the monitored area, wherein the interaction monitor component monitors interactions associated with the first user occurring within the set of geographical boundaries, wherein the temporal fence defines a monitoring start-time and a monitoring end-time, and wherein the interaction monitor monitors the interactions associated with the first user occurring after the monitoring start-time and before the monitoring end-time;
- an anonymization component, implemented on the at least one processor, that generates an anonymized transcript of dialogue between the first user and the second user occurring during the interaction, wherein the anonymized transcript excludes identifying data associated with the at least one other user;
- a machine learning component, implemented on the at least one processor, that obtains feedback from a plurality of sources and analyzes the feedback with the set of recommended action criteria to generate a set of variable weights;
- wherein the variable weights are utilized by the score generation component to calculate a per-event interaction score for the first user based on the set of actions taken by the first user to resolve the identified event;
- a set of interaction score variables comprising a set of situation resolution rules, situation avoidance rules, and de-escalation goals;
- wherein the set of interaction score variables are combined with a set of variable weights to generate a set of weighted score generation variables utilized by a score generation component to generate an interaction score;
- a feedback request component, implemented on the at least one processor, that outputs a feedback request to a user device associated with a second user;
- wherein the feedback request comprises a feedback code enabling the second user to access a feedback application for providing feedback regarding resolution of the identified event associated with the second user;
- a task allocation component, implemented on the at least one processor, that assigns a second user to assist the first user in accomplishing at least one of de-escalating the situation associated with the identified event and resolving the situation associated with the identified event;
- wherein the second user is a user having greater experience resolving situations of a same or similar type as the situation associated with the identified event;
- on condition the set of previous interaction scores comprises at least one previous interaction score within an acceptable score threshold range and at least one previous interaction score within an unacceptable score threshold range, calculating an average score based on each score in the set of previous interaction scores;
- assigning the third user to assist the first user in resolving the situation on condition the average score is within the unacceptable score threshold range;
- continuing to monitor the interaction without providing additional assistance on condition the average score is within the acceptable score threshold range;
- generating a first interaction score for the first user based on a first set of actions taken by the first user associated with a first event and an outcome of the first event;
- generating a second interaction score for the first user based on a second set of actions taken by the first user associated with a different second event and an outcome of the second event;
- wherein the first interaction score indicates a degree with which the first set of actions taken by the first user during a first interaction associated with the first event conforms with the set of recommended action criteria;
- wherein the second interaction score indicates a degree with which the second set of actions performed by the first user during a second interaction associated with the second event conforms with the set of recommended action criteria;
- monitoring, by an interaction monitor component, a set of interactions between the first user and at least one other user occurring within a set of geographical boundaries defined by a geofence;
- wherein the interaction monitor component monitors the set of interactions occurring after a monitoring start-time and before a monitoring end-time defined by a temporal fence;
- generating, by an anonymization component, an anonymized transcript of dialogue between the first user and the second user;
- wherein the anonymized transcript excludes identifying data associated with the second user;
- requesting, by a feedback request component, feedback from the second user via a feedback request output to a user device associated with the second user;
- the interaction monitor component, implemented on the at least one processor, that monitors an interaction between the first user and the third user associated with the second interaction without providing additional assistance to the first user if the second set of actions taken by the user substantially conform with the set of recommended action criteria or the first interaction score is within an acceptable score threshold range;
- a task assignment component, implemented on the at least one processor, that assigns a fourth user to assist the first user in resolving the situation if the second situation associated with the second identified event remains unresolved after a threshold time-period;
- the score generation component, implemented on the at least one processor, that generates a second interaction score based on the second set of actions and an outcome of the second interaction and generates an average interaction score based on the first interaction score and the second interaction score;

the response analysis component, implemented on the at least one processor, that determines whether to provide the additional situation-resolution instructions to the first user during a third interaction occurring within the monitored area based on the average interaction score and the acceptable score threshold range; and generating, by an anonymization component, implemented on the at least one processor, that anonymizes a transcript of dialogue between the first user and the second user, wherein the anonymized transcript excludes identifying data associated with the second user.

At least a portion of the functionality of the various elements in FIG. 1, FIG. 2, FIG. 3, FIG. 4, FIG. 5, FIG. 6, FIG. 7, FIG. 8, FIG. 9, FIG. 10, and FIG. 11 can be performed by other elements in FIG. 1, FIG. 2, FIG. 3, FIG. 4, FIG. 5, FIG. 6, FIG. 7, FIG. 8, FIG. 9, FIG. 10, and FIG. 11, or an entity (e.g., processor 106, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, and FIG. 11

In some examples, the operations illustrated in FIG. 12, FIG. 13, and FIG. 14 can be implemented as software instructions encoded on a computer readable medium, in hardware programmed or designed to perform the operations, or both. For example, aspects of the disclosure can be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice is provided to the users of the collection of the data (e.g., via a dialogue box or preference setting) and users are given the opportunity to give or deny consent for the monitoring and/or collection. The consent can take the form of opt-in consent or opt-out consent.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform particular tasks or implement particular abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for providing customized interactions-related assistance. For example, the elements illustrated in FIG. 1, FIG. 2, FIG. 3, FIG. 4, FIG. 5, FIG. 6, FIG. 7, FIG. 8, FIG. 9, FIG. 10, and FIG. 11, such as when encoded to perform the operations illustrated in FIG. 12, FIG. 13, and FIG. 14, constitute exemplary means for analyzing a set of actions taken by a first user during a course of an interaction between the first user and a second user to resolve a situation associated with the second user using a set of recommended action criteria for situation resolution; exemplary means for determining whether the set of actions substantially conforms to a set of recommended action criteria, the set of recommended action criteria comprising at least one recommended action for resolving a same or similar situation; exemplary means for retrieving a set of previous interaction scores associated with the first user from a data storage device on condition the set of actions taken by the user are substantially non-conforming with the set of recommended action criteria; exemplary means for outputting a task assignment instructing a third user to assist the first user to a user device associated with the third user via a network on condition the set of previous interaction scores is a null set; exemplary means for outputting the task assignment instructing the third user to assist the first user to the user device associated with the third user via the network on condition the set of previous interaction scores is within an unacceptable score threshold range; exemplary means for continuing to monitor the interaction without providing additional assistance unless an assistance request is received from a user device associated with the first user on condition the set of previous interaction scores is within an acceptable score threshold range.

Other non-limiting examples provide one or more computer storage devices having a first computer-executable instructions stored thereon for providing real-time customized remote interactions-related assistance. When executed by a computer, the computer performs operations including analyzing a set of actions taken by a first user during an interaction between the first user and a second user to resolve a situation associated with the second user using a set of recommended action criteria for situation resolution; determining whether the set of actions substantially conforms to the set of recommended action criteria, the set of recommended action criteria comprising at least one recommended action for resolving a same or similar situation; retrieving a set of previous interaction scores associated with the first user from a data storage device on condition the set of actions are substantially non-conforming with the set of recommended action criteria; outputting a task assignment to a user device associated with a third user via a network on condition the set of previous interaction scores is a null set; outputting the task assignment instructing the third user to assist the first user to the user device associated with the third user via the network on condition the set of previous interaction scores is within an unacceptable score threshold range; and continuing to monitor the interaction without providing additional assistance unless an assistance request is received from a user device associated with the first user on condition the set of previous interaction scores is within an acceptable score threshold range.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for customized remote interactions-related assistance, the system comprising:
    a memory;
    at least one processor communicatively coupled to the memory;
    a set of sensor devices generating sensor data associated with a monitored area, the set of sensor devices including at least one microphone;
    an interaction monitor component, implemented on the at least one processor, that analyzes the sensor data to monitor an event in real-time and identifies a set of actions taken by a first user based on the analysis, the set of actions taken during an interaction between the first user and at least one other user within the monitored area associated with the event;
    a response analysis component, stored in the memory and implemented on the at least one processor, that analyzes the identified set of actions using a set of recommended action criteria, stored in the memory, to determine whether the identified set of actions results in resolution of the event and substantially conforms to the set of recommended action criteria, the response analysis component retrieves at least one previous interaction score of the first user from a data storage device responsive to the event remaining unresolved and the identified set of actions taken by the first user are substantially non-conforming with the set of recommended action criteria, the set of recommended action criteria comprising at least one of a recommended action associated with the event;
    a score generation component, implemented on the at least one processor, configured to generate an interaction score associated with the event, wherein the interaction score indicates a degree with which the identified set of actions taken by the first user conforms to the set of recommended action criteria stored in the memory; and
    a notification component, implemented on the at least one processor, that outputs a resolution assistance notification to at least one user device associated with a second user based on at least one of the interaction score being within an unacceptable score threshold range or the at least one previous interaction score being within the unacceptable score threshold range, the resolution assistance notification comprising an instruction to the second user to assist the first user in resolving the event.

2. The system of claim 1, wherein the score generation component further generates a set of weighted score generation variables, the set of weighted score generation variables generating additional interaction scores.

3. The system of claim 1, further comprising:
a smart badge associate with the first user, wherein the smart badge comprises at least one of a camera, a microphone, and a biometric sensor.

4. The system of claim 1, further comprising:
a geofence and a temporal fence associated with the interaction monitor component, wherein the geofence comprises a set of geographical boundaries defining the monitored area, wherein the interaction monitor component monitors interactions associated with the first user occurring within the set of geographical boundaries, wherein the temporal fence defines a monitoring start-time and a monitoring end-time, and wherein the interaction monitor monitors the interactions associated with the first user occurring after the monitoring start-time and before the monitoring end-time.

5. The system of claim 1, further comprising:
an anonymization component, implemented on the at least one processor, that generates an anonymized transcript of dialogue between the first user and the at least one other user occurring during the interaction, wherein the anonymized transcript excludes identifying data associated with the first user and the at least one other user.

6. The system of claim 1, further comprising:
a machine learning component, implemented on the at least one processor, that obtains feedback from a plurality of sources and analyzes the feedback with the set of recommended action criteria to generate a set of variable weights, wherein the variable weights are utilized by a score generation component to calculate the interaction score for the first user based on the identified set of actions taken by the first user to resolve the event.

7. The system of claim 1, further comprising:
a set of interaction score variables comprising a set of situation resolution rules, situation avoidance rules, and de-escalation goals, wherein the set of interaction score variables are combined with a set of variable weights to generate a set of weighted score generation variables utilized by the score generation component to generate the interaction score.

8. The system of claim 1, further comprising:
a feedback request component, implemented on the at least one processor, that outputs a feedback request to a user device associated with the at least one other user, wherein the feedback request comprises a feedback code enabling the at least one other user to access a feedback application for providing feedback regarding resolution of the event associated with the at least one other user.

9. The system of claim 1, further comprising:
a task allocation component, implemented on the at least one processor, that assigns the second user to assist the first user in accomplishing at least one of de-escalating a situation associated with the event and resolving the situation associated with the event, wherein the second user has greater experience resolving situations of a same or similar type as the situation associated with the event.

10. A computer-implemented method for customized remote interactions-related assistance, the computer-implemented method comprising:
analyzing, by a response analysis component stored in a memory, a set of actions taken by a first user during an interaction between the first user and a second user to resolve a situation associated with the second user using a set of recommended action criteria, stored in the memory, for situation resolution;
determining, by the response analysis component, whether the set of actions substantially conforms to the set of recommended action criteria, the set of recommended action criteria comprising at least one recommended action for resolving a same or similar situation;
generating, by a score generation component, an interaction score associated with the event, wherein the interaction score indicates a degree with which the identified set of actions taken by the first user conforms to the set of recommended action criteria stored in the memory;
responsive to the set of actions being substantially non-conforming with the set of recommended action criteria, retrieving, by the response analysis component, a set of previous interaction scores associated with the first user from a data storage device;
responsive to the set of previous interaction scores is a null set, outputting a task assignment, by a task allocation component, to a user device associated with a third user via a network, the task assignment instructing the third user to assist the first user in resolving the situation;
responsive to at least one of the interaction score being within an unacceptable score threshold range or the set of previous interaction scores being within the unacceptable score threshold range, outputting the task assignment instructing the third user to assist the first user to the user device associated with the third user via the network; and
responsive to the set of previous interaction scores is within an acceptable score threshold range, continuing to monitor the interaction without providing additional assistance unless an assistance request is received from a user device associated with the first user.

11. The computer-implemented method of claim 10, further comprising:
responsive to the set of previous interaction scores comprises at least one previous interaction score within the acceptable score threshold range and at least one previous interaction score within the unacceptable score threshold range, calculating an average score based on each score in the set of previous interaction scores;
assigning the third user to assist the first user in resolving the situation responsive to the average score being within the unacceptable score threshold range; and
continuing to monitor the interaction without providing additional assistance responsive to the average score being within the acceptable score threshold range.

12. The computer-implemented method of claim 10, wherein generating the interaction score further comprises:
generating a first interaction score for the first user based on a first set of actions taken by the first user associated with a first interaction and an outcome of the first interaction; and
generating a second interaction score for the first user based on a second set of actions taken by the first user associated with a different second interaction and an outcome of the second interaction, wherein the first interaction score indicates a degree with which the first set of actions conforms with the set of recommended action criteria, and wherein the second interaction score indicates the degree with which the second set of actions conforms with the set of recommended action criteria.

13. The computer-implemented method of claim 10, further comprising:
monitoring, by an interaction monitor component, a set of interactions associated with the first user occurring within a set of geographical boundaries defined by a geofence, wherein the interaction monitor component monitors the set of interactions occurring after a monitoring start-time and before a monitoring end-time defined by a temporal fence.

14. The computer-implemented method of claim 10, further comprising:
generating, by an anonymization component, an anonymized transcript of dialogue between the first user and the second user, wherein the anonymized transcript excludes identifying data associated with the second user.

15. The computer-implemented method of claim 10, further comprising:
requesting, by a feedback request component, feedback from the second user via a feedback request output to a user device associated with the second user.

16. A system for providing customized remote interactions-related assistance, the system comprising:
a memory;
at least one processor communicatively coupled to the memory;
a set of sensor devices generating sensor data within a set of geographical boundaries defining a monitored area;
an interaction monitor component, implemented on the at least one processor, that identifies a first set of actions taken by a first user during a first interaction with a second user based on the sensor data;
a response analysis component, stored in the memory and implemented on the at least one processor, that analyzes the first set of actions using a set of recommended action criteria, stored in the memory, and determines whether the first set of actions conform to the set of recommended action criteria, the set of recommended action criteria comprising at least one of a recommended action for resolving a same or similar situation associated with the interaction;
a score generation component, implemented on the at least one processor, that generates a first interaction score associated with the first interaction based on the analyzed first set of actions and an outcome of the first interaction, wherein the first interaction score indicates a degree with which the first set of actions taken by the first user conforms with the set of recommended action criteria stored in the memory;
the interaction monitor component, implemented on the at least one processor, that identifies a second set of actions taken by the first user during a second interaction with a third user based on analysis of the sensor data; and
a notification component, implemented on the at least one processor, that outputs additional instructions recommending at least one action to be taken by the first user during the second interaction to facilitate resolution of the second interaction based on the first interaction score being within an unacceptable score threshold range.

17. The system of claim 16, further comprising:
the interaction monitor component, implemented on the at least one processor, that monitors an interaction between the first user and the third user associated with the second interaction without providing additional assistance to the first user if the second set of actions taken by the first user substantially conform with the set of recommended action criteria or the first interaction score is within an acceptable score threshold range.

18. The system of claim 16, further comprising:
a task assignment component, implemented on the at least one processor, that assigns a fourth user to assist the first user in resolving an issue associated with the interaction if the issue remains unresolved after a threshold time-period.

19. The system of claim 16, wherein:
the score generation component, implemented on the at least one processor, further generates a second interaction score based on the second set of actions and an outcome of the second interaction and generates an aggregate interaction score based on the first interaction score and the second interaction score; and
the response analysis component, implemented on the at least one processor, determines whether to provide additional situation-resolution instructions to the first user during a third interaction occurring within the monitored area based on the aggregate interaction score and an acceptable score threshold range.

20. The system of claim 16, further comprising:
generating, by an anonymization component, implemented on the at least one processor, that anonymizes a transcript of dialogue between the first user and the second user, wherein the anonymized transcript excludes identifying data associated with the second user.

* * * * *